United States Patent
Kimura et al.

(10) Patent No.: US 11,445,479 B2
(45) Date of Patent: Sep. 13, 2022

(54) RADIO NETWORK SLICING IN 5G NEW RADIO (NR)

(71) Applicant: SONY CORPORATION, Tokyo (JP)

(72) Inventors: Ryota Kimura, Tokyo (JP); Hiroaki Takano, Saitama (JP); Ryo Sawai, Tokyo (JP); Fumio Teraoka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/648,254

(22) PCT Filed: Aug. 29, 2018

(86) PCT No.: PCT/JP2018/031953
§ 371 (c)(1),
(2) Date: Mar. 18, 2020

(87) PCT Pub. No.: WO2019/065059
PCT Pub. Date: Apr. 4, 2019

(65) Prior Publication Data
US 2020/0245296 A1   Jul. 30, 2020

(30) Foreign Application Priority Data
Sep. 27, 2017   (JP) .............................. JP2017-186520

(51) Int. Cl.
*H04W 72/04* (2009.01)
*H04L 45/745* (2022.01)

(52) U.S. Cl.
CPC ........... *H04W 72/04* (2013.01); *H04L 45/745* (2013.01)

(58) Field of Classification Search
CPC . H04W 72/04; H04W 36/0033; H04W 36/14; H04W 36/0038; H04W 36/125; H04W 92/20; H04L 45/745
See application file for complete search history.

(56) References Cited

U.S. PATENT DOCUMENTS

| | | | |
|---|---|---|---|
| 2012/0155494 A1* | 6/2012 | Basso | H04L 47/2441 370/474 |
| 2016/0353367 A1 | 12/2016 | Vrzic et al. | |
| 2016/0353422 A1 | 12/2016 | Vrzic et al. | |

(Continued)

FOREIGN PATENT DOCUMENTS

| | | |
|---|---|---|
| CN | 107113195 A | 8/2017 |
| CN | 107637111 A | 1/2018 |

(Continued)

OTHER PUBLICATIONS

WO_2018029931_A1 (Year: 2018).*

(Continued)

*Primary Examiner* — Ian N Moore
*Assistant Examiner* — Rushil Parimal Sampat
(74) *Attorney, Agent, or Firm* — Chip Law Group

(57) ABSTRACT

There is provided a communication apparatus including a communication control section that performs, using a network address configured by m bytes, communication control on one or more network slices, and the network address has a prefix section that includes, in a portion of high-order n bytes, a slice number that identifies the one or more network slices and a subnet number in the one or more network slices.

11 Claims, 25 Drawing Sheets

(56) References Cited

U.S. PATENT DOCUMENTS

| | | | |
|---|---|---|---|
| 2016/0353465 A1 | 12/2016 | Vrzic et al. | |
| 2017/0237656 A1* | 8/2017 | Gage | H04L 61/2521 370/392 |
| 2017/0245316 A1* | 8/2017 | Salkintzis | H04W 48/16 |
| 2019/0191348 A1* | 6/2019 | Futaki | H04W 36/0033 |
| 2020/0145833 A1* | 5/2020 | Thakolsri | H04W 4/00 |

FOREIGN PATENT DOCUMENTS

| | | | | |
|---|---|---|---|---|
| CN | 107710832 A | 2/2018 | | |
| EP | 3257320 A1 | 12/2017 | | |
| EP | 3278504 A1 | 2/2018 | | |
| EP | 3295698 A1 | 3/2018 | | |
| EP | 3331204 A1 | 6/2018 | | |
| EP | 3402232 A1 * | 11/2018 | | H04W 16/02 |
| JP | 2018-513659 A | 5/2018 | | |
| KR | 20180014060 A | 2/2018 | | |
| WO | 2016/192636 A1 | 12/2016 | | |
| WO | 2016/192637 A1 | 12/2016 | | |
| WO | 2016/192639 A1 | 12/2016 | | |
| WO | 2017/057025 A1 | 4/2017 | | |

OTHER PUBLICATIONS

Matsushima, et al., "Discussion of Programmable Mobile User-Plane with SRv6 (Segment Routing IPv6).", 3GPP TSG CT4 Meeting #79, Krakow, C4-174204, Poland; Aug. 21-25, 2017, Source: SoftBank Corp, 16 pages.

International Search Report and Written Opinion of PCT Application No. PCT/JP2018/031953, dated Oct. 2, 2018, 08 pages ISRWO.

McKeown, et al., "OpenFlow: Enabling Innovation in Campus Networks", ACM SIGCOMM Computer Communication Review, vol. 38, No. 2, Apr. 2008, pp. 69-74.

"Discussion of Programmable Mobile User-Plane with SRv6 (Segment Routing IPv6)", Softbank Corp., 3GPP TSG CT4 Meeting #79, Krakow, Poland, Aug. 21-25, 2017, 16 pages.

Ishiyama, et al., "LINA: A New Approach to Mobility Support in Wide Area Networks", IEICE Transactions on Communications, vol. E84-B, No. 8, Aug. 2001, pp. 2076-2086.

Rosen, et al., "Multiprotocol Label Switching Architecture", Network Working Group, RC 3031, Jan. 2001, pp. 1-61.

Ochiai, et al., "Realization of Moving Cells based on Locator/ID Separation in Mobile Network", 2017 Information Processing Society of Japan, vol. 2017-DPS-171, No. 20, 2017, pp. 1-8.

Mahalingam, et al., "Virtual extensible Local Area Network (VXLAN): A Framework for Overlaying Virtualized Layer 2 Networks over Layer 3 Networks", RFC 7348, Independent Submission, Aug. 2014, pp. 1-22.

Ochiai, et al., "Realization of Moving Cells based on Locator/ID Separation in Mobile Network", Information Processing Society of Japan, IPSJ SIG Technical Report, vol. 2017, No. 20, Jun. 1, 2017, 8 pages.

McKeown, et al., "OpenFlow: Enabling Innovation in Campus Networks", ACM SIGCOMM Computer Communication Review, vol. 38, No. 2, Apr. 2008, 6 pages.

Mahalingam, et al., "Virtual eXtensible Local Area Network (VXLAN): A Framework for Overlaying Virtualized Layer 2 Networks over Layer 3 Networks", Category: Informational, ISSN: 2070-1721, Aug. 2014, 22 pages.

Matsushima, et al., "Discussion of Programmable Mobile User-Plane with SRv6 (Segment Routing IPv6).", 3GPP TSG CT4 Meeting #79, Krakow, Poland, Aug. 21-25, 2017, Source: SoftBank Corp., 16 pages.

Rosen, et al., "Multiprotocol Label Switching Architecture", Network Working Group, Category: Standards Track, Juniper Networks, Inc., Jan. 2001, 61 pages.

"Timing requirements for eMTC ", Ericsson, 3GPP TSG-RAN4, 78bis Meeting, San Jose del Cabo, Mexico, R4-162561, Release 13.3.0, Apr. 11-15, 2016, 05 pages.

Office Action for JP Patent Application No. 2019-544453, dated May 10, 2022, 03 pages of English Translation and 03 pages of Office Action.

* cited by examiner

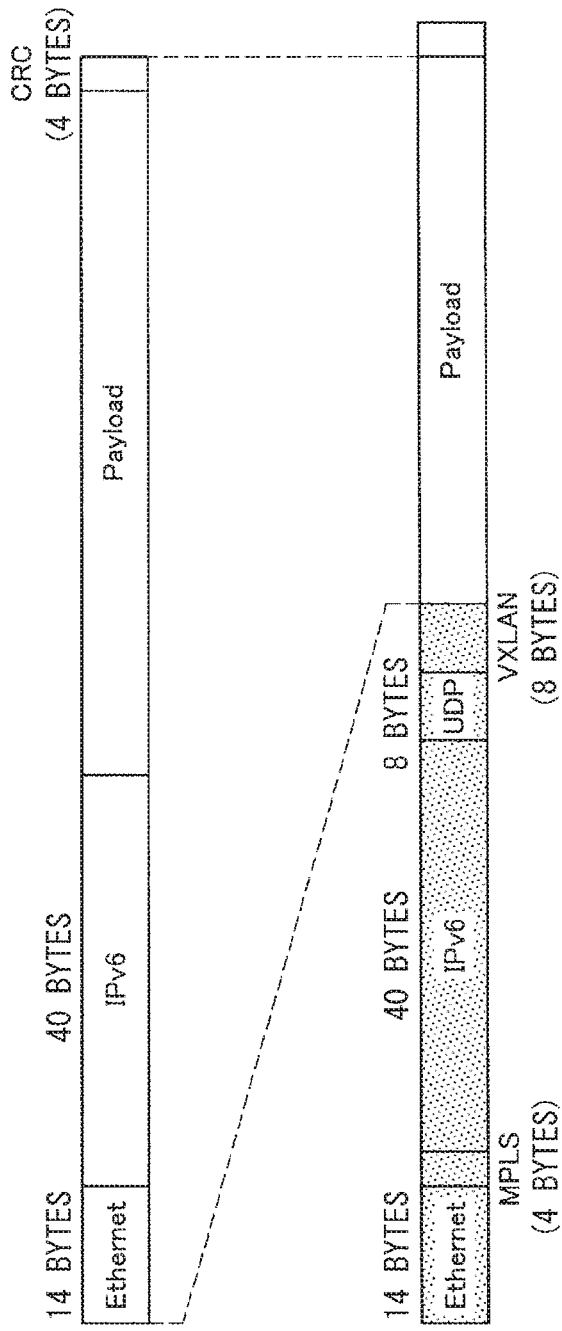
[FIG. 1]

[FIG. 2]
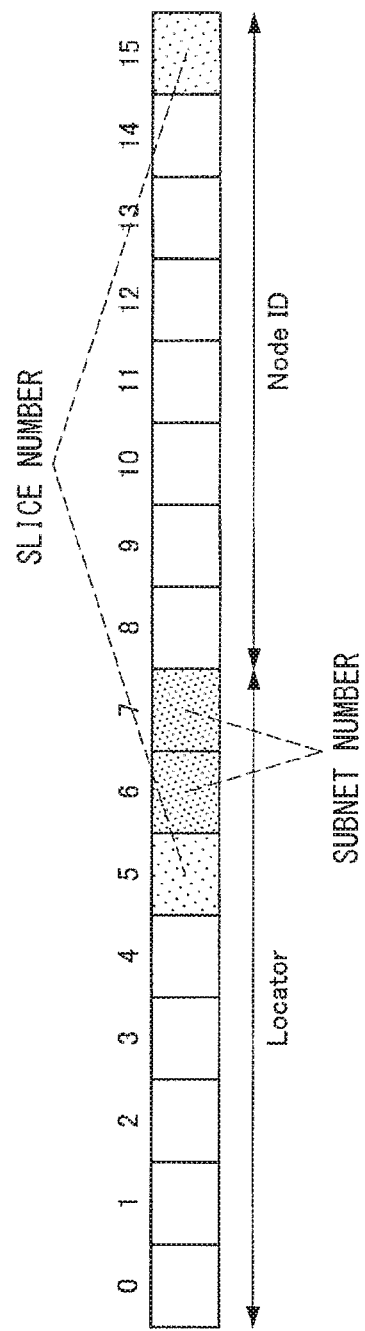

[FIG. 3]
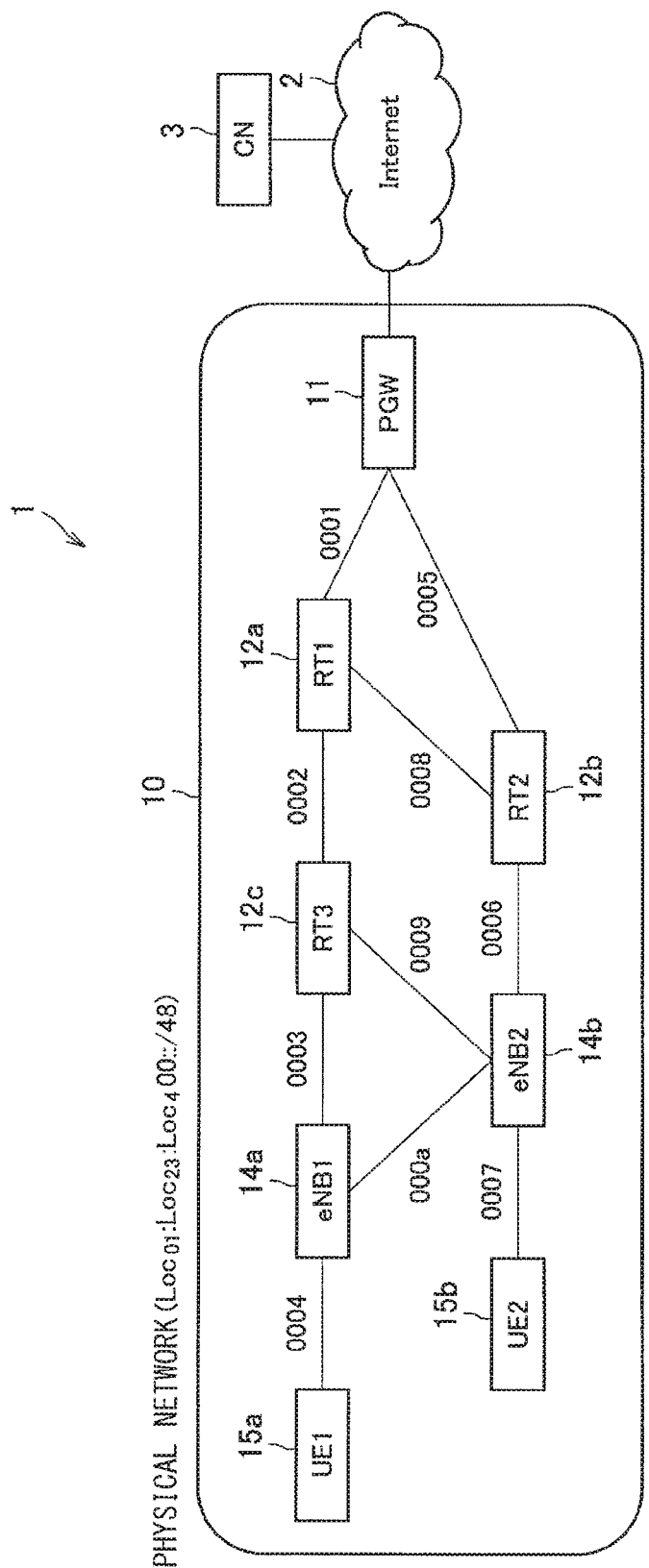

[FIG. 4]
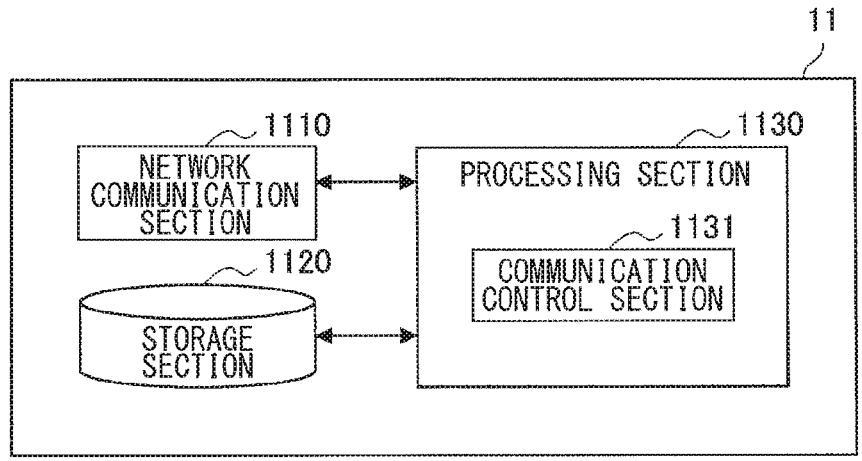
[FIG. 5]
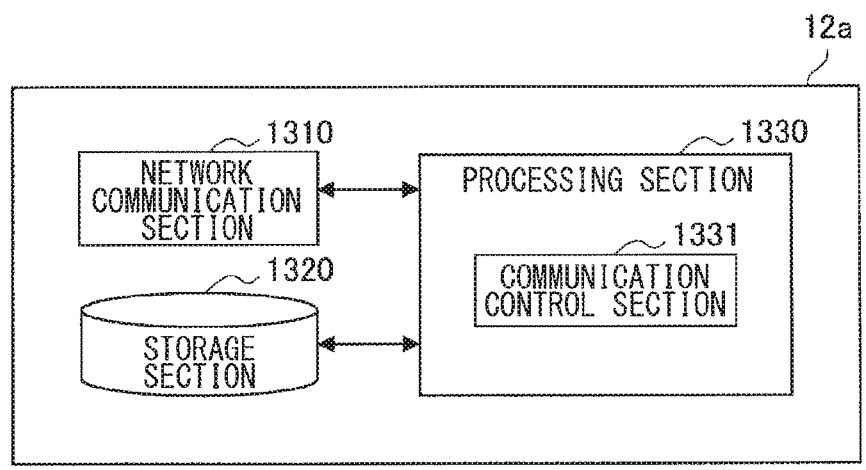
[FIG. 6]
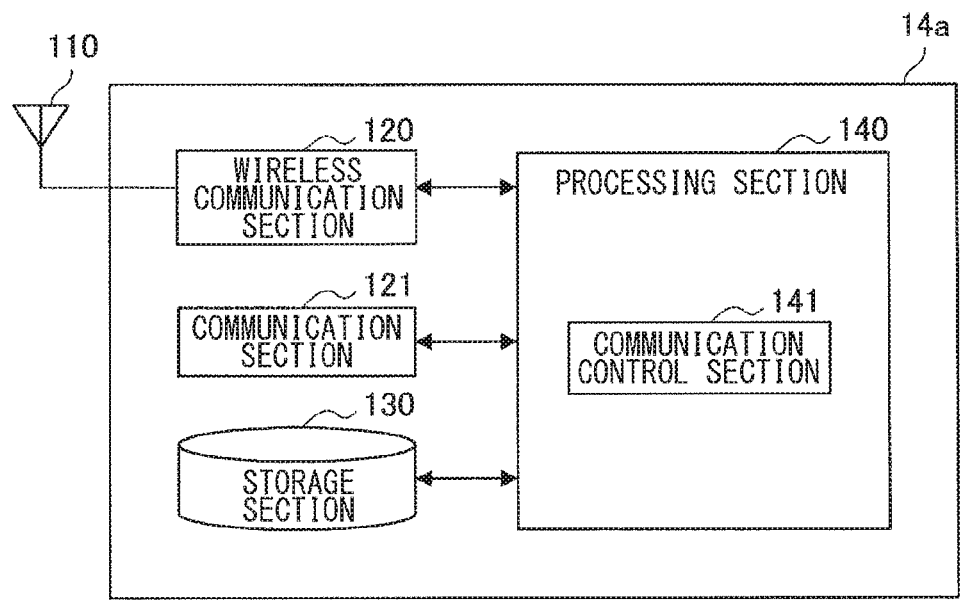

[FIG. 7]
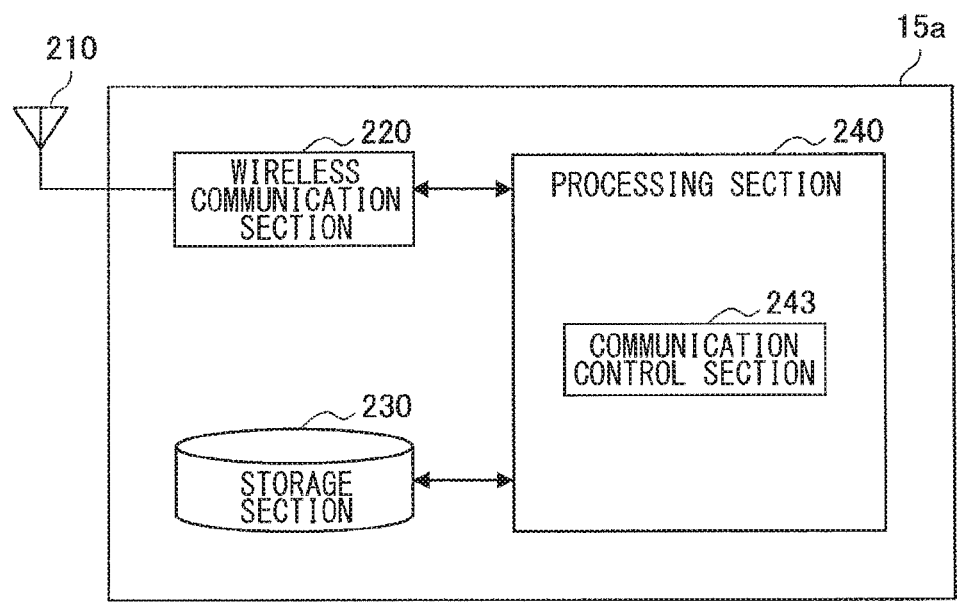

[FIG. 8]
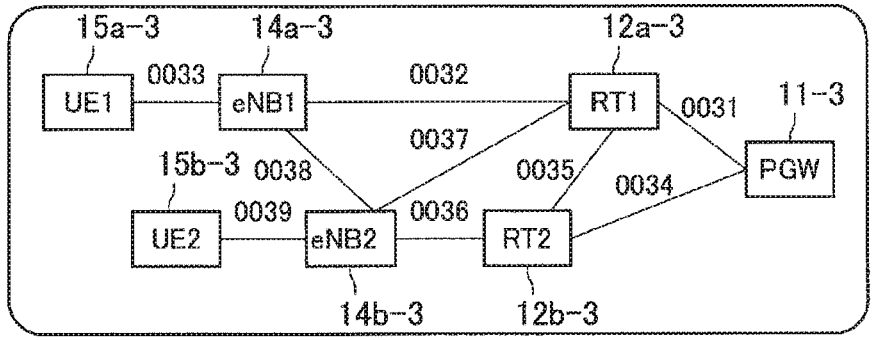
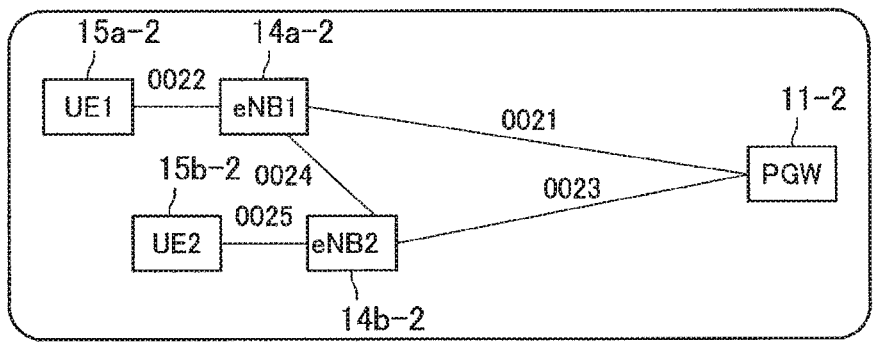
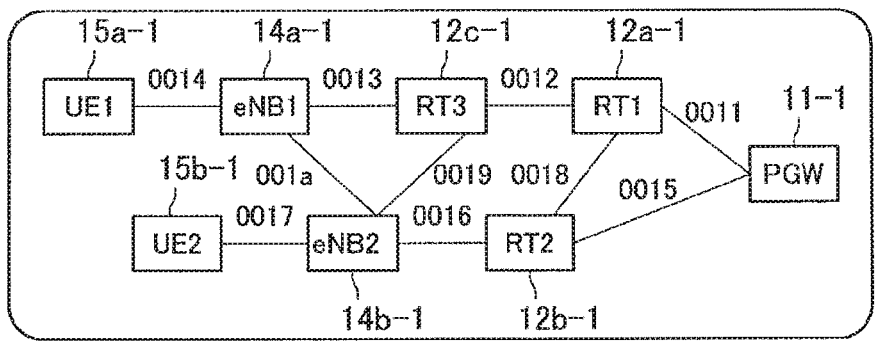
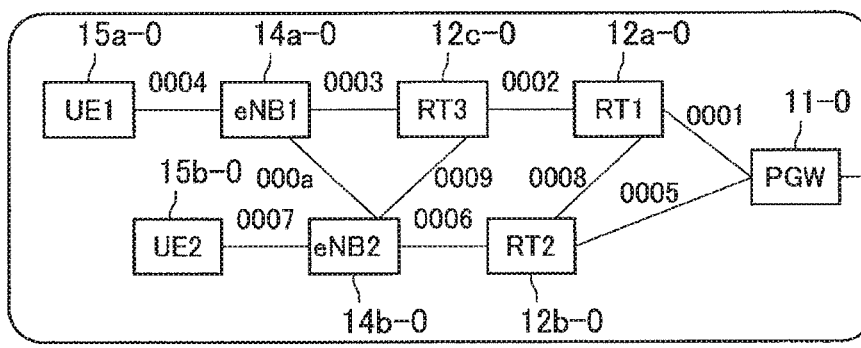
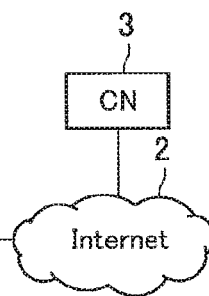

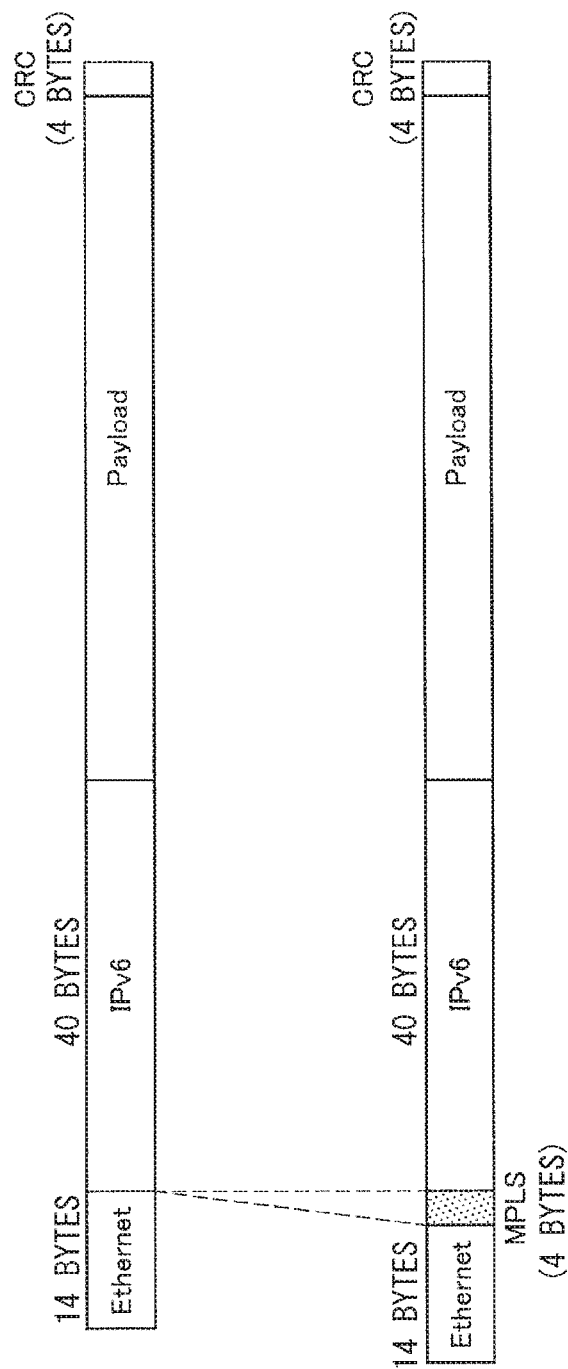
[FIG. 9]

[ FIG. 10 ]

| Dst Net | Next Hop |
|---|---|
| $Loc_{01}:Loc_{23}:Loc_4\ 00:0001::/64$ | ... |
| $Loc_{01}:Loc_{23}:Loc_4\ 00:0002::/64$ | $IP^{rt1}_0$ |
| $Loc_{01}:Loc_{23}:Loc_4\ 00:0003::/64$ | $IP^{rt1}_0$ |
| $Loc_{01}:Loc_{23}:Loc_4\ 00:0004::/64$ | $IP^{rt1}_0$ |
| $Loc_{01}:Loc_{23}:Loc_4\ 00:0005::/64$ | ... |
| $Loc_{01}:Loc_{23}:Loc_4\ 00:0006::/64$ | $IP^{rt2}_0$ |
| $Loc_{01}:Loc_{23}:Loc_4\ 00:0007::/64$ | $IP^{rt2}_0$ |
| $Loc_{01}:Loc_{23}:Loc_4\ 00:0008::/64$ | $IP^{rt1}_0$ |
| $Loc_{01}:Loc_{23}:Loc_4\ 00:0009::/64$ | $IP^{rt2}_0$ |
| $Loc_{01}:Loc_{23}:Loc_4\ 00:000a::/64$ | $IP^{rt2}_0$ |
| default | $IP^{GW}$ |

[ FIG. 11 ]

| Dst Net | Next Hop |
|---|---|
| $Loc_{01}:Loc_{23}:Loc_4\ 01:0011::/64$ | ... |
| $Loc_{01}:Loc_{23}:Loc_4\ 01:0012::/64$ | $IP^{rt1}_1$ |
| $Loc_{01}:Loc_{23}:Loc_4\ 01:0013::/64$ | $IP^{rt1}_1$ |
| $Loc_{01}:Loc_{23}:Loc_4\ 01:0014::/64$ | $IP^{rt1}_1$ |
| $Loc_{01}:Loc_{23}:Loc_4\ 01:0015::/64$ | ... |
| $Loc_{01}:Loc_{23}:Loc_4\ 01:0016::/64$ | $IP^{rt2}_1$ |
| $Loc_{01}:Loc_{23}:Loc_4\ 01:0017::/64$ | $IP^{rt2}_1$ |
| $Loc_{01}:Loc_{23}:Loc_4\ 01:0018::/64$ | $IP^{rt1}_1$ |
| $Loc_{01}:Loc_{23}:Loc_4\ 01:0019::/64$ | $IP^{rt2}_1$ |
| $Loc_{01}:Loc_{23}:Loc_4\ 01:001a::/64$ | $IP^{rt2}_1$ |
| default | $IP^{GW}$ |

[ FIG. 12 ]

| Dst Net | Next Hop |
|---|---|
| $Loc_{01}:Loc_{23}:Loc_4\,02:0021::/64$ | ... |
| $Loc_{01}:Loc_{23}:Loc_4\,02:0022::/64$ | $IP^{eNB1}{}_2$ |
| $Loc_{01}:Loc_{23}:Loc_4\,02:0023::/64$ | ... |
| $Loc_{01}:Loc_{23}:Loc_4\,02:0024::/64$ | $IP^{eNB2}{}_2$ |
| $Loc_{01}:Loc_{23}:Loc_4\,02:0025::/64$ | $IP^{eNB2}{}_2$ |
| default | $IP^{GW}$ |

[ FIG. 13 ]

| Dst Net | Next Hop |
|---|---|
| $Loc_{01}:Loc_{23}:Loc_4\,03:0031::/64$ | ... |
| $Loc_{01}:Loc_{23}:Loc_4\,03:0032::/64$ | $IP^{rt1}{}_3$ |
| $Loc_{01}:Loc_{23}:Loc_4\,03:0033::/64$ | $IP^{rt1}{}_3$ |
| $Loc_{01}:Loc_{23}:Loc_4\,03:0034::/64$ | ... |
| $Loc_{01}:Loc_{23}:Loc_4\,03:0035::/64$ | $IP^{rt1}{}_3$ |
| $Loc_{01}:Loc_{23}:Loc_4\,03:0036::/64$ | $IP^{rt2}{}_3$ |
| $Loc_{01}:Loc_{23}:Loc_4\,03:0037::/64$ | $IP^{rt1}{}_3$ |
| $Loc_{01}:Loc_{23}:Loc_4\,03:0038::/64$ | $IP^{rt1}{}_3$ |
| $Loc_{01}:Loc_{23}:Loc_4\,03:0039::/64$ | $IP^{rt2}{}_3$ |
| default | $IP^{GW}$ |

[ FIG. 14 ]

| Dst Net | Next Hop |
|---|---|
| $Loc_{01}:Loc_{23}:Loc_4\,00:0001::/64$ | ... |
| $Loc_{01}:Loc_{23}:Loc_4\,00:0002::/64$ | ... |
| $Loc_{01}:Loc_{23}:Loc_4\,00:0003::/64$ | $IP^{rt3}_0$ |
| $Loc_{01}:Loc_{23}:Loc_4\,00:0004::/64$ | $IP^{rt3}_0$ |
| $Loc_{01}:Loc_{23}:Loc_4\,00:0005::/64$ | $IP^{rt2}_0$ |
| $Loc_{01}:Loc_{23}:Loc_4\,00:0006::/64$ | $IP^{rt2}_0$ |
| $Loc_{01}:Loc_{23}:Loc_4\,00:0007::/64$ | $IP^{rt2}_0$ |
| $Loc_{01}:Loc_{23}:Loc_4\,00:0008::/64$ | ... |
| $Loc_{01}:Loc_{23}:Loc_4\,00:0009::/64$ | $IP^{rt3}_0$ |
| $Loc_{01}:Loc_{23}:Loc_4\,00:000a::/64$ | $IP^{rt3}_0$ |
| default | $IP^{PGW}_0$ |

[ FIG. 15 ]

| Dst Net | Next Hop |
|---|---|
| $Loc_{01}:Loc_{23}:Loc_4\,01:0011::/64$ | ... |
| $Loc_{01}:Loc_{23}:Loc_4\,01:0012::/64$ | ... |
| $Loc_{01}:Loc_{23}:Loc_4\,01:0013::/64$ | $IP^{rt3}_1$ |
| $Loc_{01}:Loc_{23}:Loc_4\,01:0014::/64$ | $IP^{rt3}_1$ |
| $Loc_{01}:Loc_{23}:Loc_4\,01:0015::/64$ | $IP^{rt2}_1$ |
| $Loc_{01}:Loc_{23}:Loc_4\,01:0016::/64$ | $IP^{rt2}_1$ |
| $Loc_{01}:Loc_{23}:Loc_4\,01:0017::/64$ | $IP^{rt2}_1$ |
| $Loc_{01}:Loc_{23}:Loc_4\,01:0018::/64$ | ... |
| $Loc_{01}:Loc_{23}:Loc_4\,01:0019::/64$ | $IP^{rt3}_1$ |
| $Loc_{01}:Loc_{23}:Loc_4\,01:001a::/64$ | $IP^{rt3}_1$ |
| default | $IP^{PGW}_1$ |

[ FIG. 16 ]

| Dst Net | Next Hop |
|---|---|
| $Loc_{01}:Loc_{23}:Loc_4\,03:0031::/64$ | ... |
| $Loc_{01}:Loc_{23}:Loc_4\,03:0032::/64$ | ... |
| $Loc_{01}:Loc_{23}:Loc_4\,03:0033::/64$ | $IP^{eNB1}_3$ |
| $Loc_{01}:Loc_{23}:Loc_4\,03:0034::/64$ | $IP^{rt2}_3$ |
| $Loc_{01}:Loc_{23}:Loc_4\,03:0035::/64$ | ... |
| $Loc_{01}:Loc_{23}:Loc_4\,03:0036::/64$ | $IP^{rt2}_3$ |
| $Loc_{01}:Loc_{23}:Loc_4\,03:0037::/64$ | ... |
| $Loc_{01}:Loc_{23}:Loc_4\,03:0038::/64$ | $IP^{eNB1}_3$ |
| $Loc_{01}:Loc_{23}:Loc_4\,03:0039::/64$ | $IP^{eNB2}_3$ |
| default | $IP^{PGW}_3$ |

[ FIG. 17 ]

| Dst Net | Next Hop |
|---|---|
| $Loc_{01}:Loc_{23}:Loc_4\,00:0001::/64$ | $IP^{rt1}_0$ |
| $Loc_{01}:Loc_{23}:Loc_4\,00:0002::/64$ | $IP^{rt1}_0$ |
| $Loc_{01}:Loc_{23}:Loc_4\,00:0003::/64$ | $IP^{eNB2}_0$ |
| $Loc_{01}:Loc_{23}:Loc_4\,00:0004::/64$ | $IP^{eNB2}_0$ |
| $Loc_{01}:Loc_{23}:Loc_4\,00:0005::/64$ | ... |
| $Loc_{01}:Loc_{23}:Loc_4\,00:0006::/64$ | ... |
| $Loc_{01}:Loc_{23}:Loc_4\,00:0007::/64$ | $IP^{eNB2}_0$ |
| $Loc_{01}:Loc_{23}:Loc_4\,00:0008::/64$ | ... |
| $Loc_{01}:Loc_{23}:Loc_4\,00:0009::/64$ | $IP^{eNB2}_0$ |
| $Loc_{01}:Loc_{23}:Loc_4\,00:000a::/64$ | $IP^{eNB2}_0$ |
| default | $IP^{PGW}_0$ |

[ FIG. 18 ]

| Dst Net | Next Hop |
|---|---|
| $Loc_{01}:Loc_{23}:Loc_4\,01:0011::/64$ | $IP^{rt1}_1$ |
| $Loc_{01}:Loc_{23}:Loc_4\,01:0012::/64$ | $IP^{rt1}_1$ |
| $Loc_{01}:Loc_{23}:Loc_4\,01:0013::/64$ | $IP^{eNB2}_1$ |
| $Loc_{01}:Loc_{23}:Loc_4\,01:0014::/64$ | $IP^{eNB2}_1$ |
| $Loc_{01}:Loc_{23}:Loc_4\,01:0015::/64$ | ... |
| $Loc_{01}:Loc_{23}:Loc_4\,01:0016::/64$ | ... |
| $Loc_{01}:Loc_{23}:Loc_4\,01:0017::/64$ | $IP^{eNB2}_1$ |
| $Loc_{01}:Loc_{23}:Loc_4\,01:0018::/64$ | ... |
| $Loc_{01}:Loc_{23}:Loc_4\,01:0019::/64$ | $IP^{eNB2}_1$ |
| $Loc_{01}:Loc_{23}:Loc_4\,01:001a::/64$ | $IP^{eNB2}_1$ |
| default | $IP^{PGW}_1$ |

[ FIG. 19 ]

| Dst Net | Next Hop |
|---|---|
| $Loc_{01}:Loc_{23}:Loc_4\,03:0031::/64$ | $IP^{rt1}_3$ |
| $Loc_{01}:Loc_{23}:Loc_4\,03:0032::/64$ | $IP^{rt1}_3$ |
| $Loc_{01}:Loc_{23}:Loc_4\,03:0033::/64$ | $IP^{rt1}_3$ |
| $Loc_{01}:Loc_{23}:Loc_4\,03:0034::/64$ | ... |
| $Loc_{01}:Loc_{23}:Loc_4\,03:0035::/64$ | ... |
| $Loc_{01}:Loc_{23}:Loc_4\,03:0036::/64$ | ... |
| $Loc_{01}:Loc_{23}:Loc_4\,03:0037::/64$ | $IP^{eNB2}_3$ |
| $Loc_{01}:Loc_{23}:Loc_4\,03:0038::/64$ | $IP^{eNB2}_3$ |
| $Loc_{01}:Loc_{23}:Loc_4\,03:0039::/64$ | $IP^{eNB2}_3$ |
| default | $IP^{PGW}_3$ |

[ FIG. 20 ]

| Dst Net | Next Hop |
|---|---|
| $Loc_{01}:Loc_{23}:Loc_4\ 00:0001::/64$ | $IP^{rt1}_0$ |
| $Loc_{01}:Loc_{23}:Loc_4\ 00:0002::/64$ | ... |
| $Loc_{01}:Loc_{23}:Loc_4\ 00:0003::/64$ | ... |
| $Loc_{01}:Loc_{23}:Loc_4\ 00:0004::/64$ | $IP^{eNB1}_0$ |
| $Loc_{01}:Loc_{23}:Loc_4\ 00:0005::/64$ | $IP^{rt1}_0$ |
| $Loc_{01}:Loc_{23}:Loc_4\ 00:0006::/64$ | $IP^{eNB2}_0$ |
| $Loc_{01}:Loc_{23}:Loc_4\ 00:0007::/64$ | $IP^{eNB2}_0$ |
| $Loc_{01}:Loc_{23}:Loc_4\ 00:0008::/64$ | $IP^{rt1}_0$ |
| $Loc_{01}:Loc_{23}:Loc_4\ 00:0009::/64$ | ... |
| $Loc_{01}:Loc_{23}:Loc_4\ 00:000a::/64$ | $IP^{eNB1}_0$ |
| default | $IP^{rt1}_0$ |

[ FIG. 21 ]

| Dst Net | Next Hop |
|---|---|
| $Loc_{01}:Loc_{23}:Loc_4\ 01:0011::/64$ | $IP^{rt1}_1$ |
| $Loc_{01}:Loc_{23}:Loc_4\ 01:0012::/64$ | ... |
| $Loc_{01}:Loc_{23}:Loc_4\ 01:0013::/64$ | ... |
| $Loc_{01}:Loc_{23}:Loc_4\ 01:0014::/64$ | $IP^{eNB1}_1$ |
| $Loc_{01}:Loc_{23}:Loc_4\ 01:0015::/64$ | $IP^{rt1}_1$ |
| $Loc_{01}:Loc_{23}:Loc_4\ 01:0016::/64$ | $IP^{eNB2}_1$ |
| $Loc_{01}:Loc_{23}:Loc_4\ 01:0017::/64$ | $IP^{eNB2}_1$ |
| $Loc_{01}:Loc_{23}:Loc_4\ 01:0018::/64$ | $IP^{rt1}_1$ |
| $Loc_{01}:Loc_{23}:Loc_4\ 01:0019::/64$ | ... |
| $Loc_{01}:Loc_{23}:Loc_4\ 01:001a::/64$ | $IP^{eNB1}_1$ |
| default | $IP^{rt1}_1$ |

[ FIG. 22 ]

| Dst Net | Next Hop |
|---|---|
| $Loc_{01}$:$Loc_{23}$:$Loc_4$ 00:0001::/64 | $IP^{rt3}_0$ |
| $Loc_{01}$:$Loc_{23}$:$Loc_4$ 00:0002::/64 | $IP^{rt3}_0$ |
| $Loc_{01}$:$Loc_{23}$:$Loc_4$ 00:0003::/64 | ... |
| $Loc_{01}$:$Loc_{23}$:$Loc_4$ 00:0004::/64 | ... |
| $Loc_{01}$:$Loc_{23}$:$Loc_4$ 00:0005::/64 | $IP^{eNB2}_0$ |
| $Loc_{01}$:$Loc_{23}$:$Loc_4$ 00:0006::/64 | $IP^{eNB2}_0$ |
| $Loc_{01}$:$Loc_{23}$:$Loc_4$ 00:0007::/64 | $IP^{eNB2}_0$ |
| $Loc_{01}$:$Loc_{23}$:$Loc_4$ 00:0008::/64 | $IP^{rt3}_0$ |
| $Loc_{01}$:$Loc_{23}$:$Loc_4$ 00:0009::/64 | $IP^{rt3}_0$ |
| $Loc_{01}$:$Loc_{23}$:$Loc_4$ 00:000a::/64 | ... |
| default | $IP^{rt3}_0$ |

[ FIG. 23 ]

| Dst Net | Next Hop |
|---|---|
| $Loc_{01}$:$Loc_{23}$:$Loc_4$ 01:0011::/64 | $IP^{rt3}_1$ |
| $Loc_{01}$:$Loc_{23}$:$Loc_4$ 01:0012::/64 | $IP^{rt3}_1$ |
| $Loc_{01}$:$Loc_{23}$:$Loc_4$ 01:0013::/64 | ... |
| $Loc_{01}$:$Loc_{23}$:$Loc_4$ 01:0014::/64 | ... |
| $Loc_{01}$:$Loc_{23}$:$Loc_4$ 01:0015::/64 | $IP^{eNB2}_1$ |
| $Loc_{01}$:$Loc_{23}$:$Loc_4$ 01:0016::/64 | $IP^{eNB2}_1$ |
| $Loc_{01}$:$Loc_{23}$:$Loc_4$ 01:0017::/64 | $IP^{eNB2}_1$ |
| $Loc_{01}$:$Loc_{23}$:$Loc_4$ 01:0018::/64 | $IP^{rt3}_1$ |
| $Loc_{01}$:$Loc_{23}$:$Loc_4$ 01:0019::/64 | $IP^{rt3}_1$ |
| $Loc_{01}$:$Loc_{23}$:$Loc_4$ 01:001a::/64 | ... |
| default | $IP^{rt3}_1$ |

[ FIG. 24 ]

| Dst Net | Next Hop |
|---|---|
| $Loc_{01}:Loc_{23}:Loc_4\ 02:0021::/64$ | ... |
| $Loc_{01}:Loc_{23}:Loc_4\ 02:0022::/64$ | ... |
| $Loc_{01}:Loc_{23}:Loc_4\ 02:0023::/64$ | $IP^{eNB2}_2$ |
| $Loc_{01}:Loc_{23}:Loc_4\ 02:0024::/64$ | ... |
| $Loc_{01}:Loc_{23}:Loc_4\ 02:0025::/64$ | $IP^{eNB2}_2$ |
| default | $IP^{PGW}_2$ |

[ FIG. 25 ]

| Dst Net | Next Hop |
|---|---|
| $Loc_{01}:Loc_{23}:Loc_4\ 03:0031::/64$ | $IP^{rt1}_3$ |
| $Loc_{01}:Loc_{23}:Loc_4\ 03:0032::/64$ | ... |
| $Loc_{01}:Loc_{23}:Loc_4\ 03:0033::/64$ | ... |
| $Loc_{01}:Loc_{23}:Loc_4\ 03:0034::/64$ | $IP^{rt1}_3$ |
| $Loc_{01}:Loc_{23}:Loc_4\ 03:0035::/64$ | $IP^{rt1}_3$ |
| $Loc_{01}:Loc_{23}:Loc_4\ 03:0036::/64$ | $IP^{eNB2}_3$ |
| $Loc_{01}:Loc_{23}:Loc_4\ 03:0037::/64$ | $IP^{eNB2}_3$ |
| $Loc_{01}:Loc_{23}:Loc_4\ 03:0038::/64$ | ... |
| $Loc_{01}:Loc_{23}:Loc_4\ 03:0039::/64$ | $IP^{eNB2}_3$ |
| default | $IP^{rt1}_3$ |

[ FIG. 26 ]

| Dst Net | Next Hop |
|---|---|
| $Loc_{01}:Loc_{23}:Loc_4\,00:0001::/64$ | $IP^{rt2}_0$ |
| $Loc_{01}:Loc_{23}:Loc_4\,00:0002::/64$ | $IP^{rt3}_0$ |
| $Loc_{01}:Loc_{23}:Loc_4\,00:0003::/64$ | $IP^{rt3}_0$ |
| $Loc_{01}:Loc_{23}:Loc_4\,00:0004::/64$ | $IP^{eNB1}_0$ |
| $Loc_{01}:Loc_{23}:Loc_4\,00:0005::/64$ | $IP^{rt2}_0$ |
| $Loc_{01}:Loc_{23}:Loc_4\,00:0006::/64$ | ... |
| $Loc_{01}:Loc_{23}:Loc_4\,00:0007::/64$ | ... |
| $Loc_{01}:Loc_{23}:Loc_4\,00:0008::/64$ | $IP^{rt2}_0$ |
| $Loc_{01}:Loc_{23}:Loc_4\,00:0009::/64$ | ... |
| $Loc_{01}:Loc_{23}:Loc_4\,00:000a::/64$ | ... |
| default | $IP^{rt2}_0$ |

[ FIG. 27 ]

| Dst Net | Next Hop |
|---|---|
| $Loc_{01}:Loc_{23}:Loc_4\,01:0011::/64$ | $IP^{rt2}_1$ |
| $Loc_{01}:Loc_{23}:Loc_4\,01:0012::/64$ | $IP^{rt3}_1$ |
| $Loc_{01}:Loc_{23}:Loc_4\,01:0013::/64$ | $IP^{rt3}_1$ |
| $Loc_{01}:Loc_{23}:Loc_4\,01:0014::/64$ | $IP^{eNB1}_1$ |
| $Loc_{01}:Loc_{23}:Loc_4\,01:0015::/64$ | $IP^{rt2}_1$ |
| $Loc_{01}:Loc_{23}:Loc_4\,01:0016::/64$ | ... |
| $Loc_{01}:Loc_{23}:Loc_4\,01:0017::/64$ | ... |
| $Loc_{01}:Loc_{23}:Loc_4\,01:0018::/64$ | $IP^{rt2}_1$ |
| $Loc_{01}:Loc_{23}:Loc_4\,01:0019::/64$ | ... |
| $Loc_{01}:Loc_{23}:Loc_4\,01:001a::/64$ | ... |
| default | $IP^{rt2}_1$ |

[ FIG. 28 ]

| Dst Net | Next Hop |
|---|---|
| $Loc_{01}:Loc_{23}:Loc_4\,02:0021::/64$ | $IP^{eNB2}_2$ |
| $Loc_{01}:Loc_{23}:Loc_4\,02:0022::/64$ | $IP^{eNB2}_2$ |
| $Loc_{01}:Loc_{23}:Loc_4\,02:0023::/64$ | ... |
| $Loc_{01}:Loc_{23}:Loc_4\,02:0024::/64$ | ... |
| $Loc_{01}:Loc_{23}:Loc_4\,02:0025::/64$ | ... |
| default | $IP^{PGW}_2$ |

[ FIG. 29 ]

| Dst Net | Next Hop |
|---|---|
| $Loc_{01}:Loc_{23}:Loc_4\,03:0031::/64$ | $IP^{rt1}_3$ |
| $Loc_{01}:Loc_{23}:Loc_4\,03:0032::/64$ | $IP^{rt1}_3$ |
| $Loc_{01}:Loc_{23}:Loc_4\,03:0033::/64$ | $IP^{eNB1}_3$ |
| $Loc_{01}:Loc_{23}:Loc_4\,03:0034::/64$ | $IP^{rt2}_3$ |
| $Loc_{01}:Loc_{23}:Loc_4\,03:0035::/64$ | $IP^{rt2}_3$ |
| $Loc_{01}:Loc_{23}:Loc_4\,03:0036::/64$ | ... |
| $Loc_{01}:Loc_{23}:Loc_4\,03:0037::/64$ | ... |
| $Loc_{01}:Loc_{23}:Loc_4\,03:0038::/64$ | ... |
| $Loc_{01}:Loc_{23}:Loc_4\,03:0039::/64$ | ... |
| default | $IP^{rt2}_3$ |

[ FIG. 30 ]

| Dst Net | Next Hop |
|---|---|
| $Loc_{01}:Loc_{23}:Loc_4\,00::/48$ | $IP^{eNB1}_0$ |
| default | $IP^{eNB1}_0$ |

[ FIG. 31 ]

| Dst Net | Next Hop |
|---|---|
| $Loc_{01}:Loc_{23}:Loc_4 01::/48$ | $IP^{eNB1}_1$ |
| default | $IP^{eNB1}_1$ |

[ FIG. 32 ]

| Dst Net | Next Hop |
|---|---|
| $Loc_{01}:Loc_{23}:Loc_4 02::/48$ | $IP^{eNB1}_2$ |
| default | $IP^{eNB1}_2$ |

[ FIG. 33 ]

| Dst Net | Next Hop |
|---|---|
| $Loc_{01}:Loc_{23}:Loc_4 03::/48$ | $IP^{eNB1}_3$ |
| default | $IP^{eNB1}_3$ |

[ FIG. 34 ]

| Dst Net | Next Hop |
|---|---|
| $Loc_{01}:Loc_{23}:Loc_4 00::/48$ | $IP^{eNB2}_0$ |
| default | $IP^{eNB2}_0$ |

[ FIG. 35 ]

| Dst Net | Next Hop |
|---|---|
| $Loc_{01}:Loc_{23}:Loc_4 01::/48$ | $IP^{eNB2}_1$ |
| default | $IP^{eNB2}_1$ |

[ FIG. 36 ]

| Dst Net | Next Hop |
|---|---|
| $Loc_{01}:Loc_{23}:Loc_4 02::/48$ | $IP^{eNB2}_2$ |
| default | $IP^{eNB2}_2$ |

[ FIG. 37 ]

| Dst Net | Next Hop |
|---|---|
| $Loc_{01}:Loc_{23}:Loc_4\ 03::/48$ | $IP^{eNB2}{}_3$ |
| default | $IP^{eNB2}{}_3$ |

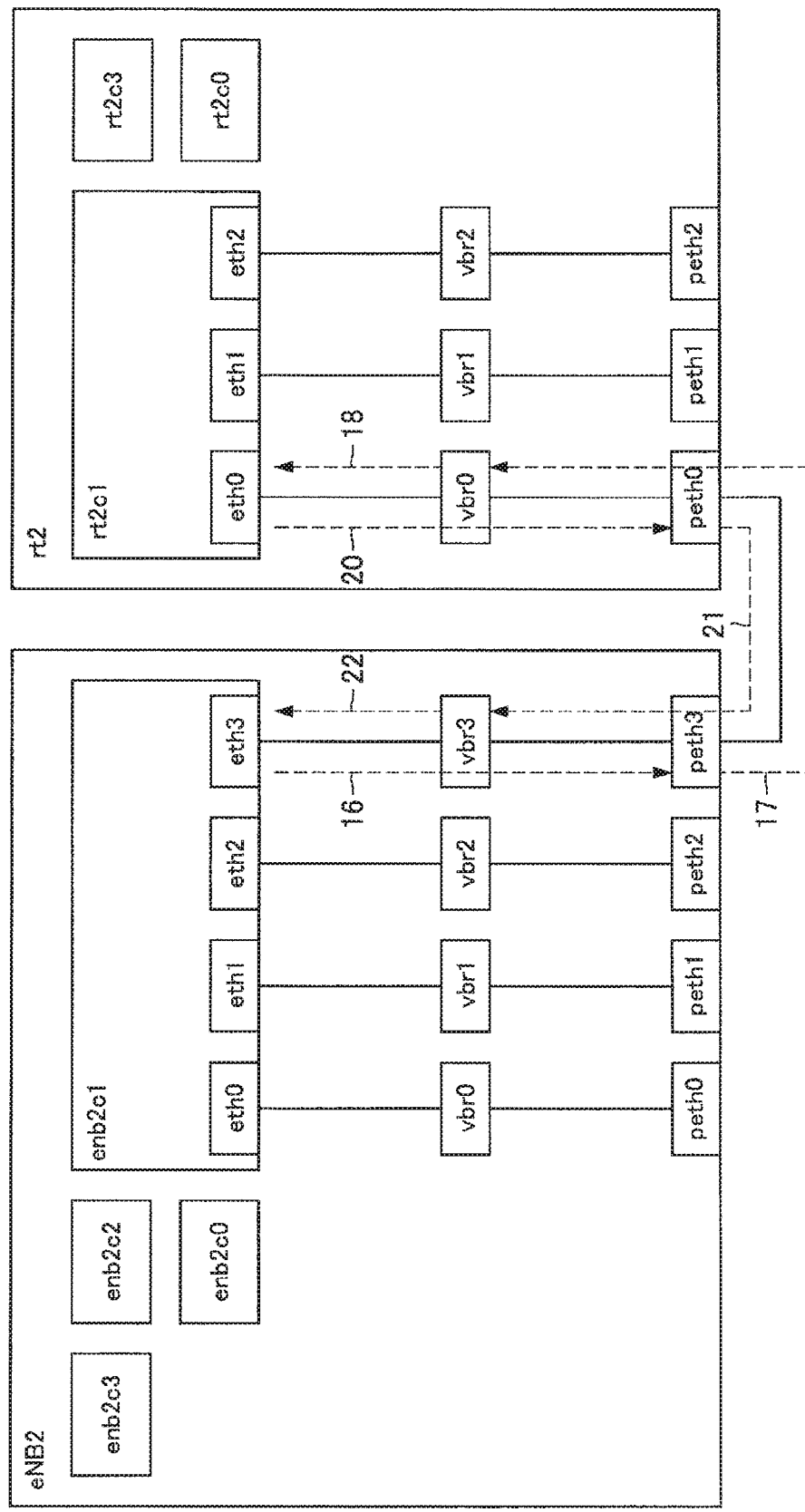
[FIG. 38]

[FIG. 39]
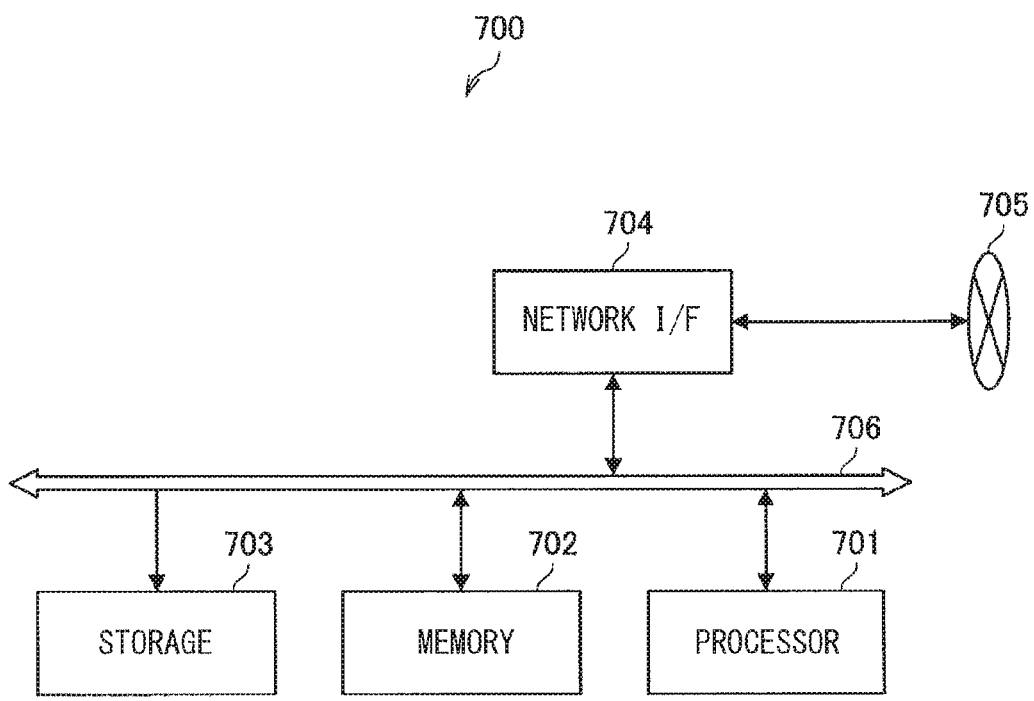

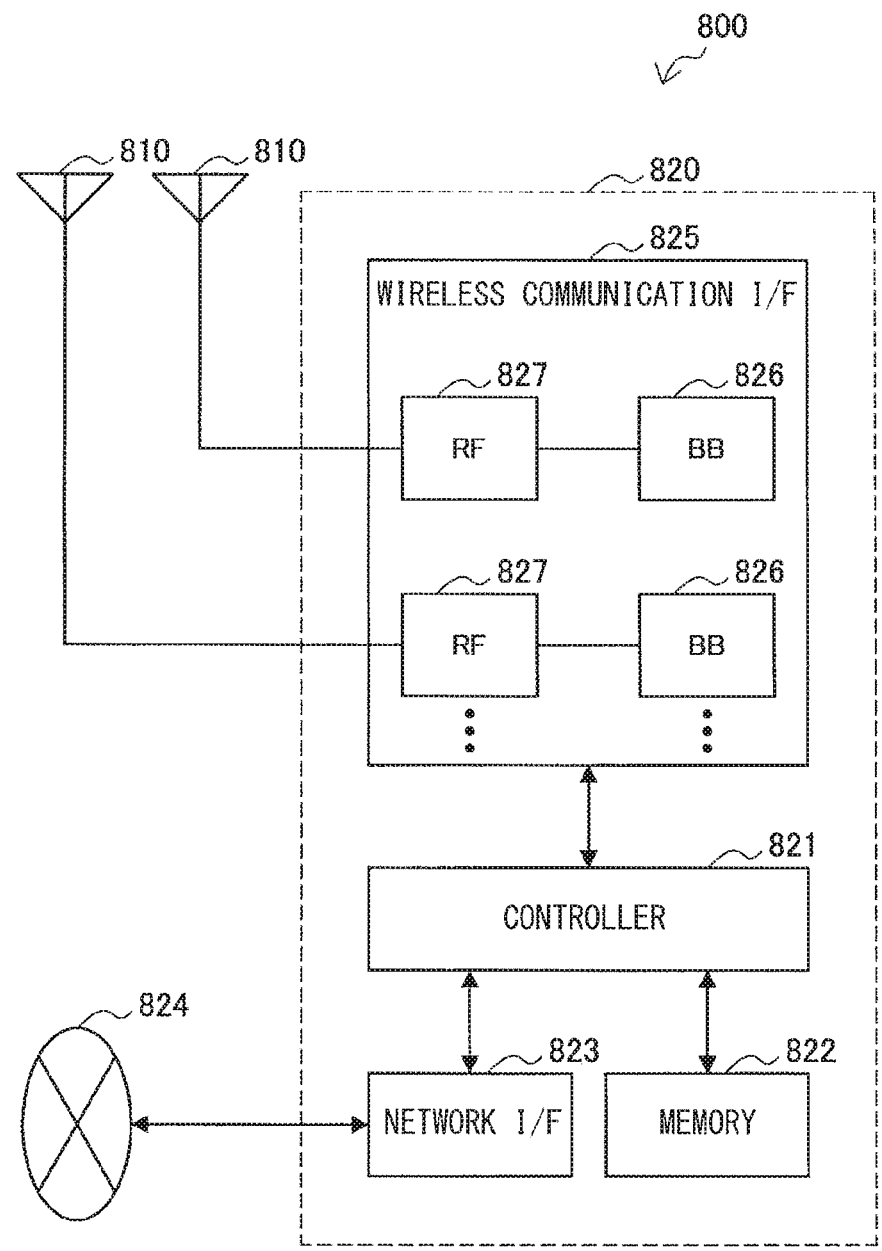
[FIG. 40]

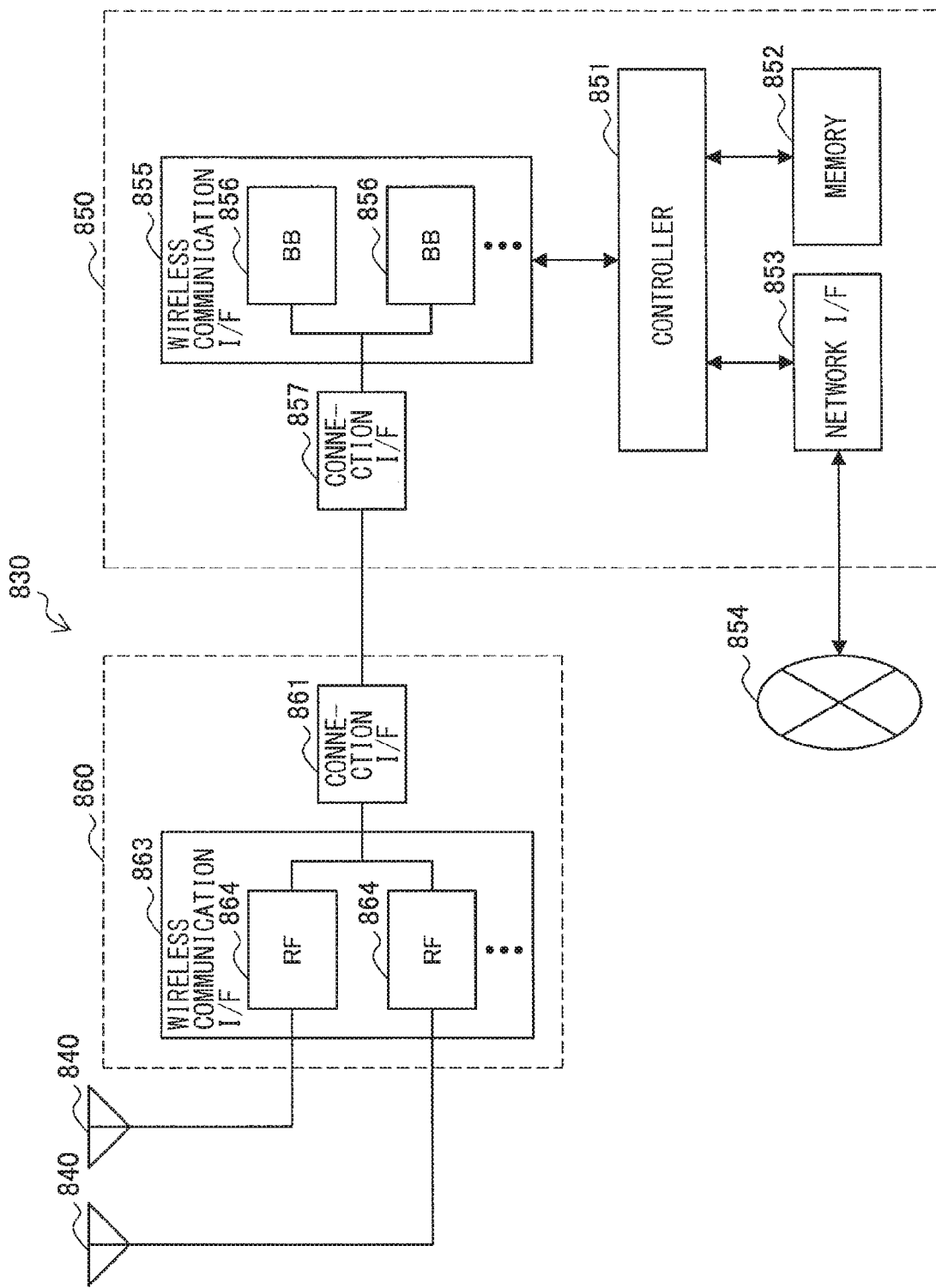
[FIG. 41]

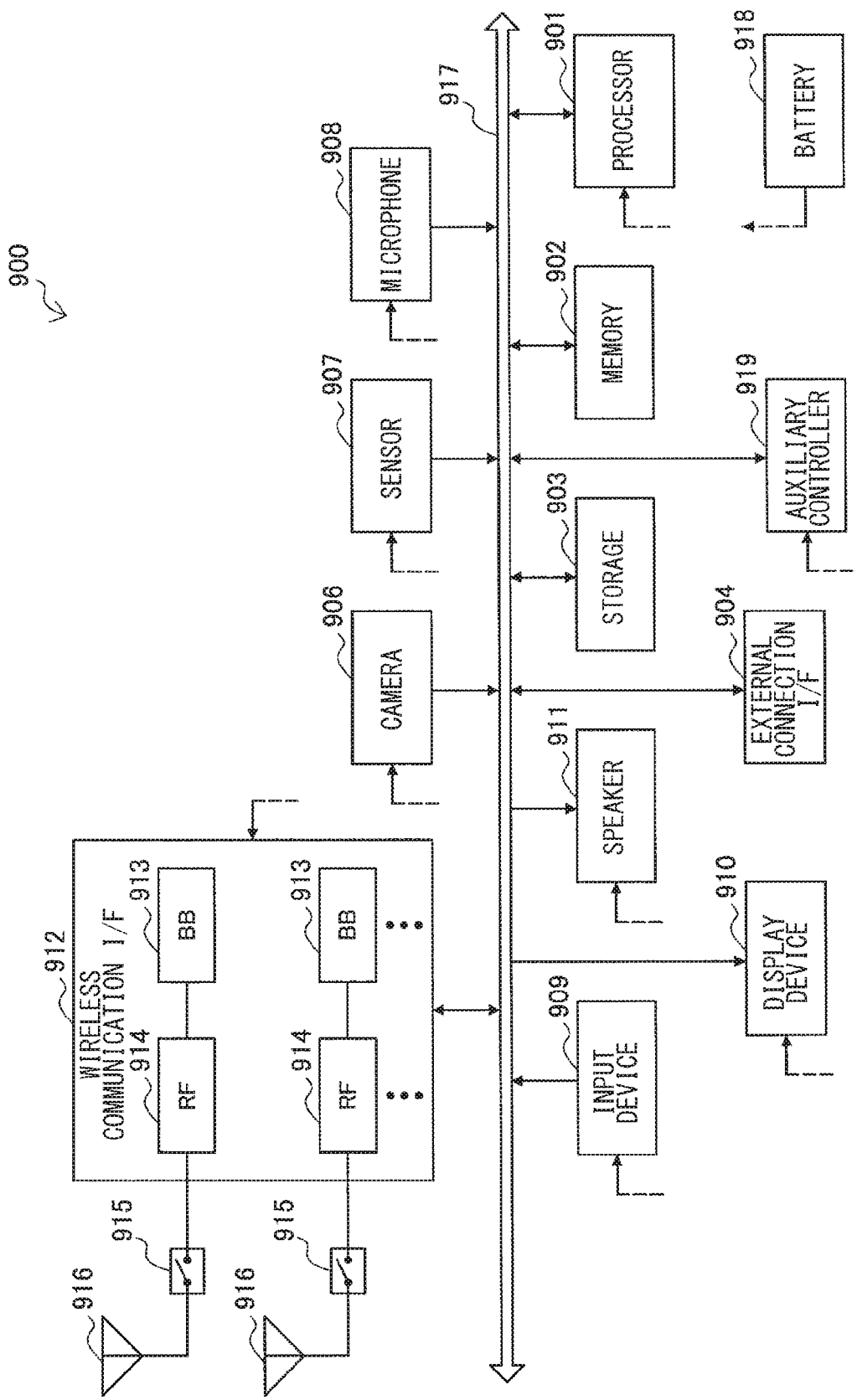
[FIG. 42]

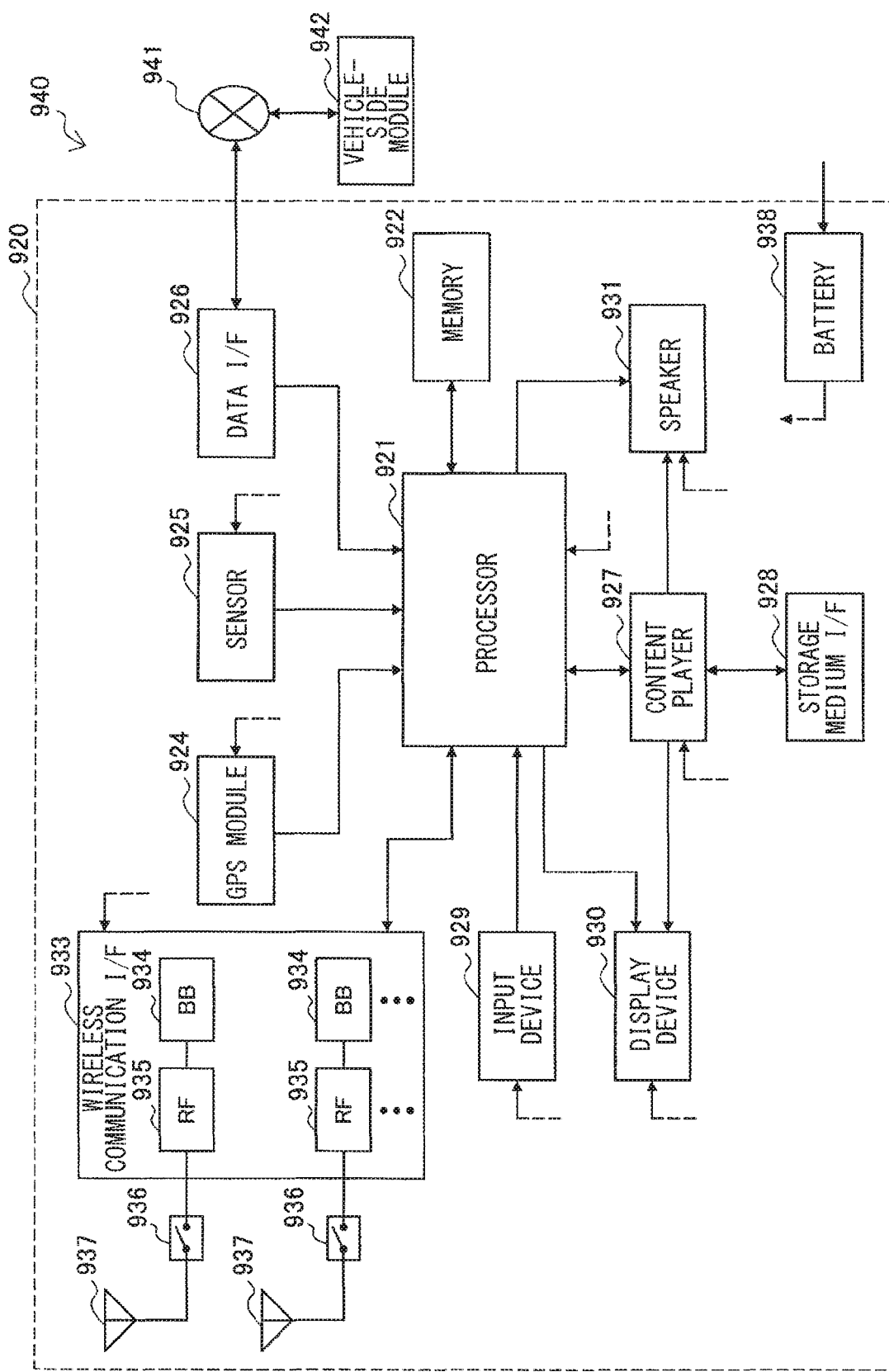

RADIO NETWORK SLICING IN 5G NEW RADIO (NR)

CROSS REFERENCE TO RELATED APPLICATIONS

This application is a U.S. National Phase of International Patent Application No. PCT/JP2018/031953 filed on Aug. 29, 2018, which claims priority benefit of Japanese Patent Application No. JP 2017-186520 filed in the Japan Patent Office on Sep. 27, 2017. Each of the above-referenced applications is hereby incorporated herein by reference in its entirety.

TECHNICAL FIELD

The present disclosure relates to a communication apparatus, a communication method, and a computer program.

BACKGROUND ART

For 5G or Fifth Generation that is a next generation mobile communication network, a communication service such as eMBB (enhanced Mobile Broadband: high-speed large-capacity communications), URLLC (Ultra-Reliable and Low Latency Communications: ultra-reliable and low latency communications), or mMTC (massive Machine Type Communications: massive machine-type communications) is desired. However, it is difficult to satisfy, at the same time, requirements of such a plurality of communication services each having a different characteristic, on one physical network such as LTE (Long Term Evolution) that is an existing mobile communication network. A core network of 5G that is a new-generation mobile communication technique aims at splitting a physical network into a plurality of virtual networks, that is, slices, and achieving a specific communication service for each slice. A slice construction method is largely divided into an SDN (Software Defined Networking) method and an Edge Overlay method. For example, as a literature that discloses such a technique, there are NPTLs 1 and 2, and the like.

CITATION LIST

Non-Patent Literature

NPTL 1: N. McKeown, T. Anderson, H. Balakrishnan, G. Parukar, L. Peterson, J. Rexford, S. Shenker, and J. Turner. "OpenFlow: enabling innovation in campus networks." ACM SIGCOMM Computer Communication Review, Vol. 38, pp. 69-74, April 2008.
NPTL 2: M. Mahalingam, D. Dutt, K. Duda, P. Agarwal, L. Kreeger, T. Sridhar, M. Bursell, and C. Wright. "Virtual eXtensible Local Area Network (VXLAN): A Framework for Overlaying Virtualized Layer 2 Networks over Layer 3 Networks." August 2014, RFC 7348.
NPTL 3: E. Rosen, A. Viswanathan, and R. Callon. "Multiprotocol Label Switching Architecture." January 2001, RFC 3031.
NPTL 4: M. Ishiyama, M. Kunishi, K. Uehara, H. Esaki, and F. Teraoka. "LINA: A New Approach to Mobility Support in Wide Area Networks." IEICE Transactions on Communications, Vol. E84-B, No. 8, pp. 2076-2086, August 2001.
NPTL 5: Takamasa Ochiai, Kohei Matsueda, Kunitake Kaneko, and Fumio Teraoka. "Realization of Moving Cells based on Locator/ID Separation in Mobile Network." Study Report from Information Processing Society of Japan, Vol. 2017-MBL-83, No. 20, pp. 1-8, June 2017.

SUMMARY OF THE INVENTION

Problem to be Solved by the Invention

However, in splitting a physical network into a plurality of virtual networks, that is, slices, there is an improvement point for each of an SDN method and an Edge Overlay method.

Thus, the present disclosure proposes a communication apparatus, a communication method, and a computer program that are novel, enhanced, and able to improve communication efficiency through improvement of an existing slice construction method.

Means for Solving the Problem

According to the present disclosure, there is provided a communication apparatus that includes a communication control section that performs, using a network address configured by m bytes, communication control on one or more network slices, and the network address has a prefix section that includes, in a portion of high-order n bytes, a slice number that identifies the one or more network slices and a subnet number in the one or more network slices.

In addition, according to the present disclosure, there is provided a communication method that includes causing a processor to perform, using a network address configured by m bytes, communication control on one or more network slices, and the network address has a prefix section that includes, in a portion of high-order n bytes, a slice number that identifies the one or more network slices and a subnet number in the one or more network slices.

In addition, according to the present disclosure, there is provided a computer program that causes a computer to execute, using a network address configured by m bytes, communication control on one or more network slices, and the network address has a prefix section that includes, in a portion of high-order n bytes, a slice number that identifies the one or more network slices and a subnet number in the one or more network slices.

Effects of the Invention

As described above, according to the present disclosure, it is possible to provide a communication apparatus, a communication method, and a computer program that are novel, enhanced, and able to improve communication efficiency through improvement of an existing slice construction method.

It is to be noted that the above-described effects are not necessarily limitative. In addition to or in place of the above effects, there may be achieved any of the effects described in the present specification or other effects that may be appreciated from the present specification.

BRIEF DESCRIPTION OF DRAWINGS

FIG. 1 is an explanatory diagram of a state in which an Ethernet (registered trademark) frame is encapsulated by VXLAN and MPLS.
FIG. 2 is an explanatory diagram of an IPv6 address format based on Locator/ID separation, according to an embodiment of the present disclosure.

FIG. 3 is an explanatory diagram of a configuration example of a network system 1 according to the embodiment.

FIG. 4 is an explanatory diagram of an example of a functional configuration of a PGW 11 according to the embodiment.

FIG. 5 is an explanatory diagram of an example of a functional configuration of a RT 12a according to the embodiment.

FIG. 6 is an explanatory diagram of an example of a functional configuration of an eNB 14a according to the embodiment.

FIG. 7 is an explanatory diagram of an example of a functional configuration of a UE 15a according to the embodiment.

FIG. 8 is an explanatory diagram of an example of constructing four slices in a physical network 10 illustrated in FIG. 3.

FIG. 9 is an explanatory diagram of an example of a packet format according to the present embodiment.

FIG. 10 is an explanatory diagram of a routing table held by a virtual node in a slice 0 in the PGW 11.

FIG. 11 is an explanatory diagram of a routing table held by a virtual node in a slice 1 in the PGW 11.

FIG. 12 is an explanatory diagram of a routing table held by a virtual node in a slice 2 in the PGW 11.

FIG. 13 is an explanatory diagram of a routing table held by a virtual node in a slice 3 in the PGW 11.

FIG. 14 is an explanatory diagram of a routing table held by a virtual node in a slice 0 in the RT 12a.

FIG. 15 is an explanatory diagram of a routing table held by a virtual node in a slice 1 in the RT 12a.

FIG. 16 is an explanatory diagram of a routing table held by a virtual node in a slice 3 in the RT 12a.

FIG. 17 is an explanatory diagram of a routing table held by a virtual node in a slice 0 in a RT 12b.

FIG. 18 is an explanatory diagram of a routing table held by a virtual node in a slice 1 in the RT 12b.

FIG. 19 is an explanatory diagram of a routing table held by a virtual node in a slice 3 in the RT 12b.

FIG. 20 is an explanatory diagram of a routing table held by a virtual node in a slice 0 in a RT 12c.

FIG. 21 is an explanatory diagram of a routing table held by a virtual node in a slice 1 in the RT 12c.

FIG. 22 is an explanatory diagram of a routing table held by a virtual node in a slice 0 in the eNB 14a.

FIG. 23 is an explanatory diagram of a routing table held by a virtual node in a slice 1 in the eNB 14a.

FIG. 24 is an explanatory diagram of a routing table held by a virtual node in a slice 2 in the eNB 14a.

FIG. 25 is an explanatory diagram of a routing table held by a virtual node in a slice 3 in the eNB 14a.

FIG. 26 is an explanatory diagram of a routing table held by a virtual node in a slice 0 in an eNB 14b.

FIG. 27 is an explanatory diagram of a routing table held by a virtual node in a slice 1 in the eNB 14b.

FIG. 28 is an explanatory diagram of a routing table held by a virtual node in a slice 2 in the eNB 14b.

FIG. 29 is an explanatory diagram of a routing table held by a virtual node in a slice 3 in the eNB 14b.

FIG. 30 is an explanatory diagram of a routing table held by a virtual node in a slice 0 in the UE 15a.

FIG. 31 is an explanatory diagram of a routing table held by a virtual node in a slice 1 in the UE 15a.

FIG. 32 is an explanatory diagram of a routing table held by a virtual node in a slice 2 in the UE 15a.

FIG. 33 is an explanatory diagram of a routing table held by a virtual node in a slice 3 in the UE 15a.

FIG. 34 is an explanatory diagram of a routing table held by a virtual node in a slice 0 in a UE 15b.

FIG. 35 is an explanatory diagram of a routing table held by a virtual node in a slice 1 in the UE 15b.

FIG. 36 is an explanatory diagram of a routing table held by a virtual node in a slice 2 in the UE 15b.

FIG. 37 is an explanatory diagram of a routing table held by a virtual node in a slice 3 in the UE 15b.

FIG. 38 is an explanatory diagram of an example of setting of an MPLS path.

FIG. 39 is a block diagram that illustrates an example of a schematic configuration of a server 700 to which a technique according to the present disclosure is applicable.

FIG. 40 is a block diagram that illustrates an example of a schematic configuration of an eNB 800 to which a technique according to the present disclosure is applicable.

FIG. 41 is a block diagram that illustrates an example of a schematic configuration of an eNB 830 to which a technique according to the present disclosure is applicable.

FIG. 42 is a block diagram that illustrates an example of a schematic configuration of a smartphone 900 to which a technique according to the present disclosure is applicable.

FIG. 43 is a block diagram that illustrates an example of a schematic configuration of a car navigation apparatus 920 to which a technique according to the present disclosure is applicable.

MODES FOR CARRYING OUT THE INVENTION

In the following, some preferred embodiments of the present disclosure are described in detail with reference to the accompanying drawings. It is to be noted that, in the present specification and drawings, repeated description is omitted for components having substantially the same functional configuration by assigning the same reference numerals.

It is to be noted that the description is given in the following order.
1. Embodiment of Present Disclosure
　　1.1. Context
　　1.2. Example of IPv6 Address Format
　　1.3. Configuration Example
　　1.4. Operation Example
2. Application Example
3. Conclusion 1. Embodiment of Present Disclosure

[1.1. Context]

First, a context that has led to an embodiment of the present disclosure is described.

As described above, for 5G that is a next generation mobile communication network, a communication network such as eMBB (enhanced Mobile Broadband: high-speed large-capacity communications), URLLC (Ultra-Reliable and Low Latency Communications: ultra-reliable and low latency communications), or mMTC (massive Machine Type Communications: massive machine-type communications) is desired. However, it is difficult to satisfy, at the same time, requirements of such a plurality of communication services each having a different characteristic, on one physical network such as LTE (Long Term Evolution) that is an existing mobile communication network. A core network of 5G that is a new-generation mobile communication technique aims at splitting a physical network into a plurality of virtual networks, that is, slices, and achieving a specific communication service for each slice.

Network slicing includes constructing a virtual network (that is, a slice) on a physical network, and isolating a resource used by each slice from another slice. For example, it is possible to provide a configuration in a manner that four slices are configured on one physical network included in a 5G core network, to include a zeroth slice (that is, physical network) for Best-Effort communication, a first slice for eMBB, a second slice for URLLC, and a third slice for mMTC.

A slice construction method is largely divided into an SDN (Software Defined Networking) method and an Edge Overlay method. In the SDN method, a physical network is constructed by an SDN switch and an SDN controller. The SDN controller manages a plurality of SDN switches, and provides an instruction to each SDN switch to perform processing on a packet. The SDN switch holds the instruction from the SDN controller in a format referred to as a flow table. The flow table includes a matching field, an action field, a counter field, and the like. The matching field defines a field and a value thereof that are to be used for packet matching. The action field defines processing on a packet that is matched. The processing includes relaying to a specified port, discarding, and rewriting of a field. The counter field is intended to count the number of matched packets. The matching field is defined for each slice and a relay method for the matched packet is set to the SDN switch, thus configuring the slice. As a protocol that specifies communication between the SDN controller and the SDN switch, OpenFlow (refer to NPTL 1) is proposed. Network resource isolation between each slice in the SDN method depends on a resource isolation function implemented on the SDN switch.

In the Edge Overlay method, a virtual data link layer (L2) link is established on a network layer (L3) through tunneling, thus configuring each slice. As a tunneling protocol, VXLAN (refer to NPTL 2) is proposed. In the Edge Overlay method, it is possible to achieve network resource isolation between each slice by establishing an MPLS (Multi-Protocol Label Switching) (refer to NPTL 3) link between each router at a tunneling endpoint.

FIG. 1 is an explanatory diagram of a state in which an Ethernet (registered trademark) frame is encapsulated by VXLAN and MPLS. An upper row in FIG. 1 illustrates an IPv6 packet (an original Ethernet frame) transmitted on the Ethernet, and a lower row illustrates an original Ethernet frame that is encapsulated by VXLAN and MPLS. As illustrated in FIG. 1, in VXLAN, the original Ethernet frame is encapsulated using an 8-byte VXLAN header, an 8-byte UDP header, a 40-byte IPv6 header, a 14-byte Ethernet header, and a 4-byte Ethernet trailer (CRC). Furthermore, when using the MPLS, a 4-byte MPLS header is inserted between the Ethernet header and the IPv6 header for encapsulation. Accordingly, a header overhead becomes 74 bytes. In VXLAN, it is necessary to add a tunneling processing function to a router that serves as a tunneling endpoint, but another router may retain an ordinary function.

However, in the SDN method, it is necessary to allow all switches to correspond to the SDN, and therefore it is difficult to introduce the SDN method. In addition, in the SDN method, the SDN controller intensively controls the SDN switches, and therefore the SDN controller is to be a Single Point of Failure (single point of failure). In addition, in the SDN method, each SDN switch operates in accordance with a flow table, and therefore in case of occurrence of a network failure, it is necessary to check the flow tables of all the SDN switches involved, thus making it difficult to isolate a cause of a failure.

In addition, in the Edge Overlay method using VXLAN, the header overhead in the encapsulation by VXLAN is significantly large such as 54 bytes in a case of using IPv4 and 74 bytes in a case of using IPv6. In addition, in the Edge Overlay method using VXLAN, there is a case where a large header overhead causes packet fragmentation processing to occur in an IP layer at an ingress node in VXLAN, and causes reassembly to occur in an IP layer at an egress node in VXLAN. In addition, in the Edge Overlay method using VXLAN, it is known that the overhead from fragmentation and reassembly processing causes a significant decrease in throughput.

Thus, in view of the foregoing points, the discloser of the present matter has earnestly considered a technique that makes it possible to improve an existing slice construction method. As a result, this has led the discloser of the present matter to conceive a technique that enables efficient slice construction by specifying an IPv6 address format based on Locator/ID separation as described in the following.

Thus, the context of an embodiment of the present disclosure has been described above.

[1.2. Example of IPv6 Address Format]

In the present embodiment, an IPv6 address format based on Locator/ID separation is specified. FIG. 2 is an explanatory diagram of an IPv6 address format based on Locator/ID separation according to an embodiment of the present disclosure. The Locator/ID separation is a manner of thinking in which a 16-byte IPv6 address is divided into a high-order part and a low-order part, to interpret the high-order part as a subnet number (Locator) to which a node is coupled, and interpret the low-order part as an identifier (ID) of the node (refer to NPTL 4). In the present embodiment, a 16-byte IPv6 address is divided into high-order 8 bytes (a 0th byte to a 7th byte) and low-order 8 bytes (an 8th byte to a 15th byte), to interpret the high-order 8 bytes as the subnet number (Locator) to which the node is coupled, and interpret the low-order 8 bytes as the identifier (ID). It is to be noted that the number of high-order bytes and the number of low-order bytes are not limited to such an example.

In the present embodiment, a 5th byte in the Locator is defined to represent a slice number, and 6th and 7th bytes in the Locator are defined to represent a subnet number in a slice. Accordingly, there are 256 slice numbers from 0 to 255, and thus it is possible to define 65536 subnets in each slice. In addition, a last byte of the ID (the 15th byte) is also defined to represent a slice number. It is to be noted that the above-described definition is an example, and a field indicating the slice number or the number of bits in the field indicating the subnet number may be changed.

It is assumed that $Loc_{01}$ is a 2-byte integer that represents a 0th byte and a 1st byte of an IPv6 address, $Loc_{23}$ is a 2-byte integer that represents a 2nd byte and a 3rd byte of the IPv6 address, $Loc_0$ is a 1-byte integer that represents a 4th byte of the IPv6 address, Slice is a 1-byte integer that represents a slice number, Subnet is a 2-byte integer that represents a subnet, $ID_{01}$ is a 2-byte integer that represents an 8th byte and a 9th byte of the IPv6 address (a 0th byte and a 1st byte in an ID part), $ID_{23}$ is a 2-byte integer that represents a 10th byte and an 11th byte of the IPv6 address (a 2nd byte and a 3rd byte in the ID part), $ID_{45}$ is a 2-byte integer that represents a 12th byte and a 13th byte of the IPv6 address (a 4th byte and a 5th byte in the ID part), and $ID_6$ is a 1-byte integer that represents a 14th byte of the IPv6 address (a 6th byte in the ID part). It is possible to express the IPv6 address in the present embodiment as follows.

$Loc_{01}:Loc_{23}:Loc_4Slice:Subnet:ID_{01}:ID_{23}:ID_{45}:ID_6Slice$

[1.3. Example of System Configuration]

FIG. 3 is an explanatory diagram of a configuration example of a network system 1 according to an embodiment of the present disclosure. The network system 1 illustrated in FIG. 3 is a network system to which an IPv6 address according to the present embodiment is applied. In the following, a configuration example of the network system 1 according to an embodiment of the present disclosure is described using FIG. 3.

As illustrated in FIG. 3, the network system 1 according to an embodiment of the present disclosure includes an Internet 2, a CN (Correspondent Node) 3, and a physical network 10. The CN 3 is an apparatus that is coupled to the Internet 2 and performs communication with a communication apparatus in the physical network 10. As an example of the CN 3, there is a web server.

The physical network 10 indicates a network range in which a communication protocol in the present embodiment operates, and is an example of a communication network in the present disclosure. As an example of the physical network 10, it is possible to give a mobile communication network, a Mobile Network Operator network, and a core network (Core Network). For example, this mobile communication network is a mobile communication network that is what is called 5G (5th Generation). In addition, in the present embodiment, IPv6 operates on an apparatus inside the physical network 10. It is to be noted that FIG. 3 illustrates only one domain, but there may be a plurality of domains.

The physical network 10 includes a PGW (Packet data network Gateway) 11, RTs (Router) 12a, 12b, and 12c, eNBs (eNodeB) 14a and 14b, and UEs 15a and 15b.

The PGW 11 is coupled to the Internet 2, and has a function to relay communication between a communication apparatus inside the physical network 10 and a communication apparatus outside the physical network 10. The RTs 12a and 12b are each a router having a routing function, and are each coupled to the PGW 11 on an upper side. The RT 12a is coupled to each of the RTs 12b and 12c on a lower side. The RT 12b is coupled to the eNB 14b on the lower side. In addition, the RT 12c is coupled to each of the eNBs 14a and 14b on the lower side. It is to be noted that the upper side is assumed to refer to a side closer to the Internet 2. In contrast, the lower side is assumed to refer to a side farther from the Internet 2.

The eNBs (eNodeB, or any of a Base Station, gNB, gNodeB, and Access Point) 14a and 14b are each a router that relays a wired network and a wireless network. When giving the eNB 14a as an example, the eNB 14a is coupled by wire to the RT 12c on an upstream side, and is wirelessly coupled to the UE 15a on a downstream side.

The UE 15a is coupled to the eNB 14a via a wireless line and is a terminal apparatus that executes various applications. In addition, the UE 15b is coupled to the eNB 14b via a wireless line and is a terminal apparatus that executes various applications.

In this physical network 10, the following IPv6-address prefix is used.

$Loc_{01}:Loc_{23}:Loc_400::/48$

In addition, a numeral assigned to a link that links each node in FIG. 3 represents, in hexadecimal, a 2-byte integer that follows the above-described IPv6-address prefix. For example, the IPv6-address prefix of a link assigned with "0001" is as follows.

$Loc_{01}:Loc_{23}:Loc_400:0001::/64$

Hereinafter, $ID^{NodeType}_{SliceNum}$ represents an ID of a node that is of a NodeType (PGW, RT, eNB, or the like) and has a slice number SliceNum. In addition, it is assumed that $IP^{NodeType}_{SliceNum}$ represents an IPv6 address of a node that is of a NodeType and has a slice number SliceNum. For example, $ID^{PGW}_{00}$ represents an ID in a slice 0 in the PGW, and $IP^{PGW}_{00}$ represents an IPv6 address in the slice 0 in the PGW.

(PGW 11)

Subsequently, an example of a functional configuration of the PGW 11 according to an embodiment of the present disclosure is described. FIG. 4 is an explanatory diagram of an example of a functional configuration of the PGW 11 according to an embodiment of the present disclosure. In the following, an example of the functional configuration of the PGW 11 according to an embodiment of the present disclosure is described using FIG. 4.

As illustrated in FIG. 4, the PGW 11 according to an embodiment of the present disclosure includes a network communication section 1110, a storage section 1120, and a processing section 1130.

The network communication section 1110 is an interface through which to perform communication with another apparatus. For example, the PGW 11 performs communication with each of the CN 3, the RTs 12a, 12b, and 12c, and the eNBs 14a, 14b, and 14c that are coupled to the Internet 2.

The storage section 1120 includes, for example, a storage medium such as an HDD or another storage medium, and holds, temporarily or permanently, a program used for an operation of the PGW 11 and various data.

The processing section 1130 includes, for example, an arithmetic unit such as a CPU, or various types of memory such as a ROM or a RAM, and provides various functions of the PGW 11. The processing section 1130 includes a communication control section 1131. It is to be noted that the processing section 1130 may further include a component other than this component. In other words, the processing section 1130 may also perform an operation other than the operation of this component.

The communication control section 1131 has a function to perform network processing using an IPv6 address format based on Locator/ID separation and various types of other processing.

(RT 12a)

Subsequently, an example of a functional configuration of the RT 12a according to an embodiment of the present disclosure is described. FIG. 5 is an explanatory diagram of an example of a functional configuration of the RT 12a according to an embodiment of the present disclosure. In the following, an example of the functional configuration of the RT 12a according to an embodiment of the present disclosure is described using FIG. 5. In addition, only the eNB 14a is illustrated here, but other RTs 12b and 12c also have a similar configuration.

As illustrated in FIG. 5, the RT 12a according to an embodiment of the present disclosure includes a network communication section 1310, a storage section 1320, and a processing section 1330.

The network communication section 1310 is an interface through which to perform communication with another apparatus. For example, the RT 12a performs communication with each of the PGW 11, the RTs 12b and 12c, and the eNB s 14a, 14b, and 14c.

The storage section 1320 includes, for example, a storage medium such as an HDD and another storage medium, and holds, temporarily or permanently, a program used for an operation of the RT 12a and various data.

The processing section 1330 includes, for example, an arithmetic unit such as a CPU or various types of memory such as a ROM or a RAM, and provides various functions of the RT 12a. The processing section 1330 includes a communication control section 1331. It is to be noted that the processing section 1330 may further include a component other than this component. In other words, the processing section 1330 may also perform an operation other than the operation of this component.

The communication control section 1331 has a function to perform network processing using an IPv6 address format based on Locator/ID separation and various types of other processing.

(eNB 14a)

Subsequently, an example of a functional configuration of the eNB 14a according to an embodiment of the present disclosure is described. FIG. 6 is an explanatory diagram of an example of a functional configuration of the eNB 14a according to an embodiment of the present disclosure. In the following, an example of a functional configuration of the eNB 14a according to an embodiment of the present disclosure is described using FIG. 6. In addition, only the eNB 14a is illustrated here, but other eNBs 14b and 14c also have a similar configuration.

As illustrated in FIG. 6, the eNB 14a according to an embodiment of the present disclosure includes an antenna section 110, a wireless communication section 120, a communication section 121, a storage section 130, and a processing section 140.

The antenna section 110 emits as a radio wave, into a space, a signal outputted by the wireless communication section 120. In addition, the antenna section 110 converts a radio wave in a space into a signal, and outputs the signal to a wireless communication section 220.

The wireless communication section 120 receives and transmits a signal. For example, the wireless communication section 120 receives an uplink signal from the RN21 that is a connection destination, and transmits a downlink signal to the RN21 that is the connection destination. In the network system 1 illustrated in FIG. 1, the communication section 121 is coupled to the RT 12a, to perform communication with each apparatus inside a domain 10.

The storage section 130 holds, temporarily or permanently, a program used for an operation of the eNB 14a and various data.

The processing section 140 provides various functions of the eNB 14a. The processing section 140 includes a communication control section 141. It is to be noted that the processing section 140 may further include a component other than this component. In other words, the processing section 140 may also perform an operation other than the operation of this component.

The communication control section 141 has a function to control communication with each apparatus inside the domain 10, or to perform connection processing, handover processing, or the like with the RN 21 that is a connection destination.

Thus, an example of the functional configuration of the eNB 14a according to an embodiment of the present disclosure has been described above.

(UE 15a)

Subsequently, an example of a functional configuration of the UE 15a according to an embodiment of the present disclosure is described. FIG. 7 is an explanatory diagram of an example of a functional configuration of the UE 15a according to an embodiment of the present disclosure. In the following, an example of the functional configuration of the UE 15a according to an embodiment of the present disclosure is described using FIG. 7.

As illustrated in FIG. 7, the UE 15a according to an embodiment of the present disclosure includes an antenna section 210, the wireless communication section 220, a storage section 230, and a processing section 240.

The antenna section 210 emits as a radio wave, into a space, a signal outputted by the wireless communication section 220. In addition, the antenna section 210 converts a radio wave in a space into a signal, and outputs the signal to the wireless communication section 220.

The wireless communication section 220 receives and transmits a signal. For example, the wireless communication section 220 receives a downlink signal from the eNB 14a that is a connection destination, and transmits an uplink signal to the eNB 14a that is the connection destination.

The storage section 230 holds, temporarily or permanently, a program used for an operation of the UE 15a and various data.

The processing section 240 provides various functions of the UE 15a. The processing section 240 includes a communication control section 243. It is to be noted that the processing section 240 may further include a component other than this component. In other words, the processing section 240 may also perform an operation other than the operation of this component. The communication control section 243 has a function to perform connection processing, handover processing, or the like with the eNB 14a that is a connection destination.

Thus, an example of a functional configuration of the UE 15a according to an embodiment of the present disclosure has been described above.

(Example of Slice Construction)

Subsequently, an example of slice construction according to an embodiment of the present disclosure is described. FIG. 8 is an explanatory diagram of an example of constructing four slices in the physical network 10 illustrated in FIG. 3. For example, it is assumed that a slice 0 is a slice equivalent to a physical network, a slice 1 is a slice for Best Effort, a slice 2 is a slice for URLLC, and a slice 3 is a slice for eMBB.

In a case where the slice 0 uses an IPv6 address prefix that is $Loc_{01}:Loc_{23}:Loc_{4}00::/48$, each of the slices 1, 2, and 3 uses an IPv6 address prefix that is a corresponding one of $Loc_{01}:Loc_{23}:Loc_{4}01::/48$, $Loc_{01}:Loc_{23}:Loc_{4}02::/48$, and $Loc_{01}:Loc_{23}:Loc_{4}03::/48r$.

The slice 0 and the slice 1 have the same configuration as the physical network 10, and all nodes in the physical network 10 are present as virtual nodes in each of the slice 0 and the slice 1. The PGW 11, the eNB 14a, the eNB 14b, the UE 15a, and the UE 15b are present as virtual nodes in each of the slice 0, the slice 2, and the slice 3. Whereas, the RTs 12a and 12b are present as virtual nodes in the slice 3. A physical node and a virtual node on the physical node have a different ID for each slice. For example, an ID of a virtual node PGW11-0 of the PGW 11 in the slice 0 (physical network), an ID of a virtual node PGW11-1 of the PGW 11 in the slice 1, an ID of a virtual node PGW11-2 of the PGW 11 in the slice 2, and an ID of a virtual node PGW11-3 of the PGW 11 in the slice 3 are each a corresponding one of $ID^{PGW}_{01}:ID^{PGW}_{23}:ID^{PGW}_{45}:ID^{PGW}_{6}00$,
$ID^{PGW}_{01}:ID^{PGW}_{23}:ID^{PGW}_{45}:ID^{PGW}_{6}01$,
$ID^{PGW}_{01}:ID^{PGW}_{23}:ID^{PGW}_{45}:ID^{PGW}_{6}02$, and
$ID^{PGW}_{01}:ID^{PGW}_{23}:ID^{PGW}_{45}:ID^{PGW}_{6}03$.

Here, $ID^{PGW}_{01}$, $ID^{PGW}_{23}$, and $ID^{PGW}_{45}$ are each a 2-byte integer, and $ID^{PGW}_{6}$ is a 1-byte integer.

In addition, the UE 15*a* and virtual nodes UE 15*a*-0, UE 15*a*-1, UE 15*a*-2, and UE 15*a*-3 corresponding thereto have, in the respective slices 0, 1, 2, and 3, the following IPv6 addresses, respectively.

Loc01:Loc$_{23}$:Loc$_4$00:0004:$ID^{UE1}_{01}$:$ID^{UE1}_{23}$:$ID^{UE1}_{45}$:$ID^{UE1}_{6}$00,

Loc01:Loc$_{23}$:Loc$_4$01:0014:$ID^{UE1}_{01}$:$ID^{UE1}_{23}$:$ID^{UE1}_{45}$:$ID^{UE1}_{6}$01,

Loc01:Loc$_{23}$:Loc$_4$02:0024:$ID^{UE1}_{01}$:$ID^{UE1}_{23}$:$ID^{UE1}_{45}$:$ID^{UE1}_{6}$02, and Loc01:Loc$_{23}$:Loc$_4$03:0034:$ID^{UE1}_{01}$:$ID^{UE1}_{23}$:$ID^{UE1}_{45}$:$ID^{UE1}_{6}$03.

In a similar manner, the UE 15*b* and virtual nodes UE 15*b*-0, UE 15*b*-1, UE 15*b*-2, and UE 15*b*-3 corresponding thereto have, in the respective slices 0, 1, 2, and 3, the following IPv6 addresses, respectively.

Loc01:Loc$_{23}$:Loc$_4$00:0007:$ID^{UE2}_{01}$:$ID^{UE2}_{23}$:$ID^{UE2}_{45}$:$ID^{UE2}_{6}$00,

Loc01:Loc$_{23}$:Loc$_4$01:0017:$ID^{UE2}_{01}$:$ID^{UE2}_{23}$:$ID^{UE2}_{45}$:$ID^{UE2}_{6}$01,

Loc01:Loc$_{23}$:Loc$_4$02:0027:$ID^{UE2}_{01}$:$ID^{UE2}_{23}$:$ID^{UE2}_{45}$:$ID^{UE2}_{6}$02, and Loc01:Loc$_{23}$:Loc$_4$03:0037:$ID^{UE2}_{01}$:$ID^{UE2}_{23}$:$ID^{UE2}_{45}$:$ID^{UE2}_{6}$03.

In a similar manner, it is possible to specify an IPv6 address held by another node.

In a slice other than the slice 0 and the slice 1, it is assumed that an MPLS path is established between adjacent nodes, and a network resource is isolated for each MPLS path. For example, in the slice 2, an MPLS path is established between PGW11-2 and eNB14*a*-2, between PGW11-2 and eNB14*b*-2, and between eNB14*a*-2 and eNB14*b*-2. When assuming a mobile communication network, there is a wireless link between eNB14*a*-2 and UE15*a*-2, and between eNB14*b*-2 and UE15*b*-2. It is to be noted that a network resource isolation method used in the wireless link is not limited to a specific method.

FIG. 9 is an explanatory diagram of an example of a packet format according to the present embodiment. An upper row in FIG. 8 is an IPv6 packet transmitted by Ethernet, that is, an original Ethernet frame. In addition, a lower row in FIG. 8 is an Ethernet frame that is carried in the slice constructed in accordance with the present embodiment. In the slice constructed in accordance with the present embodiment, as illustrated in the lower row in FIG. 8, a 4-byte MPLS header is inserted between an Ethernet header and an IPv6 header. In other words, as compared to the foregoing Edge Overlay method using VXLAN, the slice construction method according to the present embodiment prevents generation of a header overhead resulting from slice construction.

In a case of constructing a slice as described above, each physical node or virtual node has a routing table in the slice to which each own node belongs. For example, this routing table is held in each of the storage sections 130, 230, 1120, and 1320, and each node performs data transmission with reference to the routing table that is held. FIG. 10, FIG. 11, FIG. 12, and FIG. 13 each illustrate a routing table held by, in the PGW 11, a corresponding one of the physical node (in the slice 0), the virtual node in the slice 1, the virtual node in the slice 2, and the virtual node in the slice 3. In these routing tables, "Dst Net" represents a link to a destination, and "Next Hop" represents an IPv6 address of a node to which the packet is to be transferred next.

In addition, FIG. 14, FIG. 15, and FIG. 16 each illustrate a routing table held by, in the RT 12*a*, a corresponding one of the virtual node in the slice 0, the virtual node in the slice 1, the virtual node in the slice 2, and the virtual node in the slice 3. In these routing tables, "Dst Net" represents a link to a destination, and "Next Hop" represents an IPv6 address of a node to which the packet is to be transferred next.

In addition, FIG. 17, FIG. 18, and FIG. 19 each illustrate a routing table held by, in the RT 12*b*, a corresponding one of the virtual node in the slice 0, the virtual node in the slice 1, and the virtual node in the slice 3. In these routing tables, "Dst Net" represents a link to a destination, and "Next Hop" represents an IPv6 address of a node to which the packet is to be transferred next.

In addition, FIG. 20 and FIG. 21 each illustrate a routing table held by a corresponding one of the virtual node in the slice 0 and the virtual node in the slice 1 in the RT 12*c*. In these routing tables, "Dst Net" represents a link to a destination, and "Next Hop" represents an IPv6 address of a node to which the packet is to be transferred next.

In addition, FIG. 22, FIG. 23, FIG. 24, and FIG. 25 each illustrate a routing table held by, in the eNB 14*a*, a corresponding one of the virtual node in the slice 0, the virtual node in the slice 1, the virtual node in the slice 2, and the virtual node in the slice 3. In these routing tables, "Dst Net" represents a link to a destination, and "Next Hop" represents an IPv6 address of a node to which the packet is to be transferred next.

In addition, FIG. 26, FIG. 27, FIG. 28, and FIG. 29 each illustrate a routing table held by, in the eNB 14*b*, a corresponding one of the virtual node in the slice 0, the virtual node in the slice 1, the virtual node in the slice 2, and the virtual node in the slice 3. In these routing tables, "Dst Net" represents a link to a destination, and "Next Hop" represents an IPv6 address of a node to which the packet is to be transferred next.

In addition, FIG. 30, FIG. 31, FIG. 32, and FIG. 33 each illustrate a routing table held by, in the UE 15*a*, a corresponding one of the virtual node in the slice 0, the virtual node in the slice 1, the virtual node in the slice 2, and the virtual node in the slice 3. In these routing tables, "Dst Net" represents a link to a destination, and "Next Hop" represents an IPv6 address of a node to which the packet is to be transferred next.

In addition, FIG. 34, FIG. 35, FIG. 36, and FIG. 37 each illustrate a routing table held by, in the UE 15*b*, a corresponding one of the virtual node in the slice 0, the virtual node in the slice 1, the virtual node in the slice 2, and the virtual node in the slice 3. In these routing tables, "Dst Net" represents a link to a destination, and "Next Hop" represents an IPv6 address of a node to which the packet is to be transferred next.

In each routing table, $IP^{NodeName}_{SliceNum}$ represents an IPv6 address held by a node or virtual node that is referred to as NodeName in a slice referred to as SliceNum. For example, $IP^{rT1}_{0}$ represents an IPv6 address held by RT12*a*-0 in the slice 0. It is to be noted that $IP^{GW}$ represents an IPv6 address of a gateway router coupled to the PGW 11 on a side of the Internet.

In the following, an example of packet transfer in a case of constructing such a slice is described.

(Example of Packet Transfer 1)

First, assumed is a case where a web browsing application operating on the UE 15*a* accesses a web server that operates in the CN 3 that is a server on the Internet. First, it is assumed that the web browsing application is started on the UE 15*a*. No special communication quality is necessary for website browsing, which therefore causes the slice 1 (Best Effort) to be used for the packet related to the web browsing application. Accordingly, for the web browsing application that operates on the UE 15a, at startup, the following IPv6 address is specified as a start-point IPv6 address by an OS or operating system of the UE 15a.

$IP^{UE1}_1(=Loc_{01}:Loc_{23}:Loc_401:0014:ID^{UE1}_{01}:ID^{UE1}_{23}:ID^{UE1}_{45}:ID^{UE1}_601)$

An end-point address of the IPv6 packet transmitted from the UE 15a to the CN 3 is $IP^{CN}$. The virtual node UE15a-1 in the slice 1 in the UE 15a, with reference to the routing table of the own node illustrated in FIG. 31, transfers this packet to a virtual node eNB14a-1 in the slice 1 in the eNB 14a in accordance with an entry in the last row.

Upon receiving the packet from the virtual node UE15a-1 in the slice 1 in the UE 15a, the virtual node eNB14a-1 in the slice 1 in the eNB 14a, with reference to a routing table of the own node illustrated in FIG. 23, transfers this packet to a virtual node RT12c-1 in the slice 1 in the RT 12c in accordance with an entry in the last row.

Upon receiving the packet from the virtual node eNB14a-1 in the slice 1 in the eNB 14a, the virtual node RT12c-1 in the slice 1 in the RT 12c, with reference to a routing table of the own node illustrated in FIG. 21, transfers this packet to a virtual node RT12a-1 in the slice 1 in the RT 12a in accordance with an entry in the last row.

Upon receiving the packet from the virtual node RT12c-1 in the slice 1 in the RT 12c, the virtual node RT12a-1 in the slice 1 in the RT 12a, with reference to a transfer table of the own node illustrated in FIG. 15, transfers this packet to the virtual node PGW11-1 in the slice 1 in the PGW 11 in accordance with an entry in the last row.

Upon receiving the packet from the virtual node RT12a-1 in the slice 1 in the RT 12a, the virtual node PGW11-1 in the slice 1 in the PGW 11, with reference to a transfer table of the own node illustrated in FIG. 11, transfers this packet to a side of the Internet 2 in accordance with an entry in the last row. In the Internet 2, through ordinary routing control, the packet from the virtual node RT12a-1 in the slice 1 in the RT 12a arrives at the CN 3.

A start-point address and an end-point address of the IPv6 packet transmitted from the CN 3 to the web browsing application operating on the UE 15a are as follows.

Start-point: $IP^{CN}$

End-point: $IP^{UE1}_1(=Loc_{01}:Loc_{23}:Loc_401:0014:ID^{UE1}_{01}:ID^{UE1}_{23}:ID^{UE1}_{45}:ID^{UE1}_601)$ The end-point address has a prefix assigned to this physical network, thus causing this packet to be transferred to the PGW 11 in the Internet 2 through ordinary routing control.

On a ground that a 5th byte of the end-point address has a value of 1, the PGW 11 is able to recognize, for example, in the communication control section 1131, that this packet belongs to the slice 1 (Best Effort). Upon receiving a packet from the Internet 2, the virtual node PGW11-1 in the slice 1 in the PGW 11, with reference to the transfer table of the own node illustrated in FIG. 11, transfers this packet to the virtual node RT12a-1 in the slice 1 in the RT 12a in accordance with an entry in a fourth row.

Upon receiving the packet from the virtual node PGW11-1 in the slice 1 in the PGW 11, the virtual node RT12a-1 in the slice 1 in the RT 12a, with reference to the transfer table of the own node illustrated in FIG. 15, transfers this packet to the virtual node RT12c-1 in the slice 1 in the RT 12c in accordance with an entry in a fourth row.

Upon receiving the packet from the virtual node RT12a-1 in the slice 1 in the RT 12a, the virtual node RT12c-1 in the slice 1 in the RT 12c, with reference to the routing table of the own node illustrated in FIG. 21, transfers this packet to the virtual node eNB14a-1 in the slice 1 in the eNB 14a in accordance with an entry in a fourth row.

Upon receiving the packet from the virtual node RT12c-1 in the slice 1 in the RT 12c, the virtual node eNB14a-1 in the slice 1 in the eNB 14a, with reference to the routing table of the own node illustrated in FIG. 23, transfers this packet to the virtual node UE15a-1 in the slice 1 in the UE 15a in accordance with an entry in a fourth row.

Upon receiving the packet from the virtual node eNB14a-1 in the slice 1 in the eNB 14a, the virtual node UE15a-1 in the slice 1 in the UE 15a passes this packet to the web browsing application. The web browsing application operating the UE 15a executes information display processing on the basis of the received packet.

(Example of Packet Transfer 2)

Next, assumed is a case where a VoIP (Voice over Internet Protocol) application that operates on the UE 15a communicates with a VoIP application that operates on the CN 3 that is the server on the Internet. It is assumed that the VoIP application is requested to have low delay, which therefore causes the slice 2 to be used for the packet related to the VoIP application. A start-point address and an end-point address of an IPv6 packet transmitted from the UE 15a to the CN 3 are as follows.

Start-point: $IP^{UE1}_2(=Loc_{01}:Loc_{23}:Loc_402:0022:ID^{UE1}_{01}:ID^{UE1}_{23}:ID^{UE1}_{45}:ID^{UE1}_602)$ End-point: $IP^{CN}$ The virtual node UE15a-2 in the slice 2 in the UE 15a, with reference to a routing table of the own node illustrated in FIG. 32, transfers this packet to a virtual node eNB14a-2 in the slice 2 in the eNB 14a in accordance with an entry in the last row.

Upon receiving the packet from the virtual node UE15a-2 in the slice 2 in the UE 15a, the virtual node eNB14a-2 in the slice 2 in the eNB 14a, with reference to a routing table of the own node illustrated in FIG. 24, transfers this packet to the virtual node PGW11-2 in the slice 2 in the PGW 11 in accordance with an entry in the last row.

Upon receiving the packet from the virtual node eNB14a-2 in the slice 2 in the eNB 14a, the virtual node PGW11-2 in the slice 2 in the PGW 11, with reference to a transfer table of the own node illustrated in FIG. 12, transfers this packet to the side of the Internet 2 in accordance with an entry in the last row. In the Internet 2, through ordinary routing control, the packet from the virtual node eNB14a-2 in the slice 2 in the eNB 14a arrives at the CN 3.

A start-point address and an end-point address of an IPv6 packet transmitted from the CN 3 to the VoIP application operating on the UE 15a are as follows.

Start-point: $IP^{CN}$

End-point: $IP^{UE1}_2(=Loc_{01}:Loc_{23}:Loc_402:0022:ID^{UE1}_{01}:ID^{UE1}_{23}:ID^{UE1}_{45}:ID^{UE1}_602)$ The end-point address has a prefix assigned to this physical network, thus causing this packet to be transferred to the PGW 11 in the Internet 2 through ordinary routing control.

On a ground that the 5th byte of the end-point address has a value of 2, the PGW 11 is able to recognize, for example, in the communication control section 1131, that this packet belongs to the slice 2 (for URLLC). Upon receiving a packet from the Internet 2, the virtual node PGW11-2 in the slice 2 in the PGW 11, with reference to the transfer table of the own node illustrated in FIG. 12, transfers this packet to the virtual node eNB14a-2 in the slice 2 in the eNB 14a in accordance with an entry in a second row.

Upon receiving the packet from the virtual node PGW11-2 in the slice 2 in the PGW 11, the virtual node eNB14a-2 in the slice 2 in the eNB 14a, with reference to the routing table of the own node illustrated in FIG. 24, transfers this packet to the virtual node UE15a-2 in the slice 2 in the UE 15a in accordance with an entry in a second row.

Upon receiving the packet from the virtual node eNB 14a-2 in the slice 2 in the eNB 14a, the virtual node UE15a-2 in the slice 2 in the UE 15a passes this packet to the VoIP application. The VoIP application operating on the UE 15a executes communication processing through the Internet 2 on the basis of the received packet.

(Example of Packet Transfer 3)

Next, an example of a case where the UE moves and continues communication with another eNB is illustrated. Here, for example, it is assumed to use a mobility management scheme for the UE that is illustrated in NPTL 5. In this mobility management scheme, low-order 64 bits of an IPv6 address are interpreted as an identifier of the node, and high-order 64 bits are interpreted as a prefix of a subnet to which the node is coupled. In the application layer or the transport layer, a fixed value is used for the high-order 64 bits of the IPv6 address. When the application transmits a packet, the high-order 64 bits of the IPv6 address used by the application layer are rewritten into a prefix of the subnet to which the own node and a communication-partner node are coupled in the network layer. On a reception side, the IPv6 address has the high-order 64 bits rewritten into a fixed value in the network layer, to be passed to the transport layer or the application layer. Accordingly, even if the node moves, the IPv6 address used by the application layer or the transport layer does not change, thus making it possible to continue communication.

In the above-described example of packet transfer 2, it is assumed that a connection destination of the UE 15a has moved from the eNB 14a to the eNB 14b. The IPv6 address used by the network layer of the UE 15a for communication changes before and after the movement as follows.

Before movement: $Loc_{01}:Loc_{23}:Loc_402:0022:ID^{UE1}_{01}:ID^{UE1}_{23}:ID^{UE1}_{45}:ID^{UE1}_{6}02$ After movement: $Loc_{01}:Loc_{23}:Loc_402:0025:ID^{UE1}_{01}:ID^{UE1}_{23}:ID^{UE1}_{45}:ID^{UE1}_{6}02$ When assuming, as Pref, the fixed value of the high-order 64 bits of the IPv6 address used by the application layer or the transport layer, the IPv6 address used by the VoIP application on the UE 15a does not change even if the UE 15a moves. In other words, it is possible to express the Pref as follows.

$Pref:ID^{UE1}_{01}:ID^{UE1}_{23}:ID^{UE1}_{45}:ID^{UE1}_{6}02$

Accordingly, even if the connection destination of the UE 15a changes from the eNB 14a to the eNB 14b, the VoIP application operating on the CN 3 is able to continue communication with the VoIP application operating on the UE 15a.

(Implementation of Slice Construction by Container-Based Virtualization Technique)

A container has a lighter and more isolated OS (Operating System) environment than a virtual machine, and is able to cause an application to operate therein. For example, as the OS, there is Linux (registered trademark), and as the container, there is Docker or LXC. The container shares a resource such as a kernel with a host OS. Therefore, the application operating on the container generates a small overhead as compared to a virtual machine. In the present embodiment, it is assumed to use Docker as the container, but the container used in the present disclosure is not limited to Docker.

A focus is placed on a virtual node RT12b-1 in the slice 1 in the RT 12b and a virtual node eNB14b-1 in the slice 1 in the eNB 14b as illustrated in FIG. 8. FIG. 38 is an explanatory diagram of an example of setting of an MPLS path between the virtual node RT12b-1 in the slice 1 in the RT 12b and the virtual node eNB14b-1 in the slice 1 in the eNB 14b. In the physical node eNB 14b, virtual nodes enb2c0 to enb2c3 are each present in a corresponding one of the slices 0 to 4. In the physical node RT 12b, virtual nodes rt2c0, rt2c1, and rt2c3 are each present in a corresponding one of the slice 0, the slice 1, and the slice 3. The virtual nodes enb2c0 to enb2c3 each correspond to four physical interfaces peth0 to peth3 held by the physical node eNB 14b, and the virtual node enb2c1 has four virtual interfaces eth0 to eth3. In a similar manner, the virtual nodes rt2c0, rt2c1, and rt2c3 each correspond to three physical interfaces peth0 to peth2 held by the physical node RT 12b, and the virtual node rt2c1 has three virtual interfaces eth0 to eth2. The virtual node enb2c1 and the virtual node rt2c1 are coupled to each other by an MPLS path indicated by a dashed arrow in FIG. 38. The number assigned to the dashed arrow in FIG. 38 represents an MPLS tag.

In a case where the virtual node rt2c1 transmits a packet to the virtual node enb2c1, the virtual node rt2c1 uses the virtual interface eth0. The virtual interface eth0 adds to the packet to be transmitted, an MPLS tag indicating 20. This packet is transmitted to the physical interface peth0 via a virtual bridge vbr0. The physical interface peth0 changes the MPLS tag of this packet from 20 to 21. The packet having the MPLS tag changed arrives at the physical interface peth3 of the physical node eNB 14b via a physical line. The physical interface peth3 transmits to a virtual switch vbr3, this packet that has arrived. The virtual switch vbr3 changes the MPLS tag of this packet from 21 to 22, and transmits this packet to the virtual interface eth3 of the virtual node enb2c1. The virtual interface eth3 deletes the MPLS tag of the packet that has arrived from the virtual switch vbr3, and extracts an original packet. In a similar manner, transmission from the virtual node enb2c1 to the virtual node rt2c1 is performed.

In the following, an example of creating the virtual node rt2c1 and the MPLS path at the physical node RT 12b is illustrated. Hereinafter, "rt2 #" represents an input prompt from a command interpreter on the physical node RT 12b, "rt2c1 #" represents an input prompt from a command interpreter on the virtual node rt2c1.

First, an MPLS module is loaded at the physical node RT 12b. A command therefor is as follows.

rt2 #modprobe mpls router

Next, an upper limit value of a usable MPLS label is specified. A command therefor is as follows. Here, the upper limit value of the MPLS label is assumed to be 100.

rt2 #echo 100>/proc/sys/net/mpls/platform labels

Next, the MPLS is activated at the physical interface peth0. A command therefor is as follows.

rt2 #echo 1>/proc/sys/net/mpls/conf/peth0/input

Next, a packet relay function is activated. A command therefor is as follows.

rt2 #echo 1>/proc/sys/net/ipv6/conf/all/forwarding

Next, the virtual node rt2c1 is created as a docker container. It is to be noted that it is assumed that a program necessary for a subsequent procedure has been introduced into an image file cimg that is to be used for creating the container. A command to create the virtual node rt2c1 as a docker container is as follows.

rt2 #docker run -it --name=rt2c1 --hostname=rt2c1 -privileged cimg /bin/bash

Next, the virtual bridge vbr0 is created. The virtual bridge vbr0 is assigned with an IPv6 address prefix in the slice 1.

Here, the IPv6 address prefix is assumed to be 2001:0200:0001:0016::/64 (2001:200:1:16::/64 as an abbreviation). A 5th byte that indicates 01 represents the slice 1, and a $6^{th}$ byte and a 7th byte that indicate 0016 represent a subnet number. A command to create the virtual bridge vbr0 is as follows.

rt2 #docker network create -d bridge --ipv6 --subnet=2001:200:1:16::/64 vbr0

Next, the MPLS is activated at the virtual bridge vbr0. A command therefor is as follows.

rt2 #echo 1>/proc/sys/net/mpls/conf/vbr0/input

Next, the virtual node rt2c1 and the virtual bridge vbr0 are combined. A command therefor is as follows. At this time, the virtual interface eth0 is created in the virtual node rt2c1. Here, an identifier of the virtual node rt2c1 is assumed to be 0000:0000:0000:0201 (::201 as an abbreviation). The last byte 01 represents a slice number.

rt2 #docker network connect --ip6=2001:200:1:16::201 vbr0 rt2c1

As a result, the virtual interface eth0 has an IPv6 address that is 2001:200:1:16::201. Next, the MPLS is activated at the virtual interface eth0 of the virtual node rt2c1. A command therefor is as follows.

rt2c1 #echo 1>/proc/sys/net/mpls/conf/eth0/input

Next, MPLS tag addition at the time of packet transmission is set to the virtual interface eth0 of the virtual node rt2c1. A command therefor is as follows. Here, the IPv6 address of the virtual bridge vbr3 in the physical node eNB2 is assumed to be 2001:0200:0001:0016:0000:0000:0000:1001 (2001:200:1:16::1001 as an abbreviation).

rt2c1 #ip -6 route add 2001:200:1:16::201 encap mpls 20 via 2001:200:1:16::1001 via dev eth0

Next, MPLS tag deletion at the time of packet reception is set to the virtual interface eth0 of the virtual node rt2c1. A command therefor is as follows.

rt2c1 #ip -f mpls route add 18 via 2001:200:1:16::201

Next, MPLS tag change at the time of packet transmission is set to the physical interface peth0. A command therefor is as follows. It is to be noted that the IPv6 address of the physical interface peth3 of the physical node eNB 14b is assumed to be peth3_addr.

rt2 #ip -f mpls route add 20 as 21 via inet6 peth3_addr dev peth0

Next, MPLS tag change at the time of packet reception is set to the virtual bridge vbr0. A command therefor is as follows. It is to be noted that 2001:200:1:16::201 is the IPv6 address of the virtual interface eth0.

rt2 #ip -f mpls route add 17 as 18 via inet6 2001:200:1:16::201 dev vbr0

In accordance with the procedure as described above, the virtual nodes enb2c1 and rt2c1 are coupled to each other by an MPLS path. In the same manner, it is possible to set another virtual node or an MPLS path between these virtual nodes.

2. Application Example

A technique according to the present disclosure is applicable to various products. For example, the eNB14a, -14b, or -14c may be achieved as any type of eNB (evolved Node B) such as a macro eNB or a small eNB. The small eNB may be an eNB that covers a cell smaller than a macro cell, such as a Pico eNB, a micro eNB, or a Home (Femto) eNB. Instead, the eNB14a, -14b, or -14c may be achieved as another type of base station such as a NodeB or a BTS (Base Transceiver Station). The eNB14a, -14b, or -14c may include a main body that controls wireless communication (also referred to as a base station apparatus) and one or more RRHs (Remote Radio Head) provided at a location different from a location of the main body. In addition, various types of terminals that are to be described later may function as the eNB14a, -14b, or -14c by executing a base-station function temporarily or semi-permanently.

In addition, for example, the UE 15a or 15b may be achieved as a mobile terminal such as a smartphone, a tablet PC (Personal Computer), a laptop computer, a portable game terminal, a portable/dongle mobile router, or a digital camera, or an in-vehicle terminal such as a car navigation apparatus. In addition, the UE 15a or 15b may be achieved as a terminal that performs M2M (Machine-to-Machine) communication (also referred to as an MTC (Machine Type Communication) terminal). Furthermore, the UE 15a or 15b may be a wireless communication module mounted on these terminals (for example, an integrated circuit module including one die).

[2.1. Application Example Regarding PGW]

FIG. 39 is a block diagram that illustrates an example of a schematic configuration of a server 700 to which a technique according to the present disclosure is applicable. The server 700 includes a processor 701, a memory 702, a storage 703, a network interface 704, and a bus 706.

For example, the processor may be a CPU (Central Processing Unit) or a DSP (Digital Signal Processor), and controls various types of functions of the server 700. The memory 702 includes a RAM (Random Access Memory) and a ROM (Read Only Memory), and holds a program to be executed by the processor 701 and data. The storage 703 may include a storage medium such as a semiconductor memory or a hard disk.

The network interface 704 is a wired communication interface through which to couple the server 700 to a wired communication network 705. The wired communication network 705 may be a core network such as an EPC (Evolved Packet Core), or a PDN (Packet Data Network) such as the Internet.

The bus 706 couples, to each other, the processor 701, the memory 702, the storage 703, and the network interface 704. The bus 706 may include two or more buses different from each other in speed (for example, a high-speed bus and a low-speed bus).

In the server 700 illustrated in FIG. 39, one or more components included in the PGW 11 that has been described with reference to FIG. 4 (for example, the communication control section 1131) may be implemented in the processor 701. As an example, a program for causing a processor to function as the above-described one or more components (in other words, a program for causing a processor to execute an operation of the above-described one or more components) may be installed on the server 700, and the program may be executed by the processor 701. As another example, the server 700 may be mounted with a module including the processor 701 and the memory 702, and the above-described one or more components may be implemented in the module. In this case, the above-described module may cause the memory 702 to hold a program for causing a processor to function as the above-described one or more components and cause the processor 701 to execute the program. As described above, as an apparatus that includes the above-described one more components, the server 700 or the above-described module may be provided, or the above-described program for causing a processor to function as the above-described one or more components may be provided. In addition, a readable recording medium on which the program is recorded may be provided.

In addition, for example, in the server 700 illustrated in FIG. 39, the network communication section 1110 that has been described with reference to FIG. 4 may be implemented in the network interface 704. In addition, the storage section 1120 or the storage section 1320 may be implemented in the memory 702 and/or the storage 703.

[2.2. Application Example Regarding Base Station]
(First Application Example)

FIG. 40 is a block diagram that illustrates a first example of a schematic configuration of an eNB to which a technique according to the present disclosure is applicable. An eNB 800 has one or more antennas 810, and a base station apparatus 820. Each antenna 810 and the base station apparatus 820 may be coupled to each other via an RF cable.

Each antenna 810 has a single or a plurality of antenna elements (for example, a plurality of antenna elements included in a MIMO antenna), and is used for reception and transmission of a wireless signal by the base station apparatus 820. The eNB 800 has the plurality of antennas 810 as illustrated in FIG. 40, and for example, each of the plurality of antennas 810 may correspond to one of a plurality of frequency bands used by the eNB 800. It is to be noted that FIG. 40 illustrates an example of the eNB 800 having the plurality of antennas 810, but the eNB 800 may have a single antenna 810.

The base station apparatus 820 includes a controller 821, a memory 822, a network interface 823, and a wireless communication interface 825.

For example, the controller 821 may be a CPU or a DSP, and causes various functions of an upper layer to operate in the base station apparatus 820. For example, the controller 821 generates a data packet from data included in a signal processed by the wireless communication interface 825, and transfers the generated packet via the network interface 823. The controller 821 may generate a bundled packet by bundling data from a plurality of baseband processors and transfer the generated bundled packet. In addition, the controller 821 may have a logical function to execute control such as radio resource management (Radio Resource Control), radio bearer control (Radio Bearer Control), mobility management (Mobility Management), admission control (Admission Control), or scheduling (Scheduling). In addition, the control may be executed in cooperation with a peripheral eNB or a core network node. The memory 822 includes a RAM and a ROM, and holds a program to be executed by the controller 821 and various control data (for example, a terminal list, transmission power data, scheduling data, and the like).

The network interface 823 is a communication interface through which to couple the base station apparatus 820 to a core network 824. The controller 821 may communicate with a core network node or another eNB via the network interface 823. In that case, the eNB 800 and the core network node or the other eNB may be coupled to each other by a logical interface (for example, an S1 interface or an X2 interface). The network interface 823 may be a wired communication interface or may be a wireless communication interface for wireless backhaul. In a case where the network interface 823 is a wireless communication interface, the network interface 823 may use, for wireless communication, a frequency band higher than the frequency band used by the wireless communication interface 825.

The wireless communication interface 825 supports any cellular communication system such as LTE (Long Term Evolution) or LTE-Advanced, and provides wireless connection to a terminal located in a cell of the eNB 800 via the antenna 810. The wireless communication interface 825 may typically include a baseband (BB) processor 826, an RF circuit 827, and the like. For example, the BB processor 826 may perform coding/decoding, modulation/demodulation, multiplexing/demultiplexing, and the like, and executes various signal processing in each layer (for example, L1, MAC (Medium Access Control), RLC (Radio Link Control), and PDCP (Packet Data Convergence Protocol)). The BB processor 826, instead of the controller 821, may have a portion or all of the foregoing logical function. The BB processor 826 may be a module that includes a memory that holds a communication control program, a processor that executes the program, and a related circuit, and the BB processor 826 may have a function changeable through updating of the above-described program. In addition, the above-described module may be a card or a blade that is inserted into a slot of the base station apparatus 820, or may be a chip mounted on the card or the blade. Meanwhile, the RF circuit 827 may include a mixer, a filter, an amplifier, and the like, and receives and transmits a wireless signal via the antenna 810.

The wireless communication interface 825 includes a plurality of BB processors 826 as illustrated in FIG. 40, and for example, each of the plurality of BB processor 826 may correspond to one of a plurality of frequency bands used by the eNB 800. In addition, the wireless communication interface 825 includes a plurality of RF circuits 827 as illustrated in FIG. 40, and for example, each of the plurality of RF circuits 827 may correspond to one of a plurality of antenna elements. It is to be noted that FIG. 40 illustrates an example of the wireless communication interface 825 including the plurality of BB processors 826 and the plurality of RF circuits 827, but the wireless communication interface 825 may include a single BB processor 826 or a single RF circuit 827.

In the eNB 800 illustrated in FIG. 40, one or more components included in the eNB 14*a* that has been described with reference to FIG. 5 (for example, the processing section 140) may be implemented in the wireless communication interface 825. Alternatively, at least a portion of these components may be implemented in the controller 821. As an example, the eNB 800 may be mounted with a module including a portion (for example, the BB processor 826) or all of the wireless communication interface 825, and/or the controller 821, and the above-described one or more components may be implemented in the module. In this case, the above-described module holds a program for causing a processor to function as the above-described one or more components (in other words, a program for causing a processor to execute an operation of the above-described one or more components), and execute the program. As another example, a program for causing a processor to function as the above-described one or more components may be installed on the eNB 800, and the wireless communication interface 825 (for example, the BB processor 826) and/or the controller 821 may execute the program. As described above, the eNB 800, the base station apparatus 820, or the above-described module may be provided as an apparatus including the above-described one or more components, or a program for causing a processor to function as the above-described one or more components may be provided. In addition, a readable recording medium on which the above-described program is recorded may be provided.

In addition, in the eNB 800 illustrated in FIG. 40, the wireless communication section 120 that has been described with reference to FIG. 5 may be implemented in the wireless communication interface 825 (for example, the RF circuit 827). In addition, an antenna section 310 may be implemented in the antenna 810. In addition, a network communication section 330 may be implemented in the controller 821 and/or the network interface 823. In addition, a storage section 340 may be implemented in the memory 822.

(Second Application Example)

FIG. 41 is a block diagram that illustrates a second example of a schematic configuration of an eNB to which a technique according to the present disclosure is applicable. An eNB 830 has one or more antennas 840, a base station apparatus 850, and an RRH 860. Each antenna 840 and the RRH 860 may be coupled to each other via an RF cable. In addition, the base station apparatus 850 and the RRH 860 may be coupled to each other via a high-speed line such as an optical fiber cable.

Each antenna 840 has a single or a plurality of antenna elements (for example, a plurality of antenna elements included in a MIMO antenna), and is used for reception and transmission of a wireless signal by the RRH 860. The eNB 830 may have a plurality of antennas 840 as illustrated in FIG. 41, and for example, each of the plurality of antennas 840 may correspond to one of a plurality of frequency bands used by the eNB 830. It is to be noted that FIG. 41 illustrates an example of the eNB 830 having the plurality of antennas 840, but the eNB 830 may have a single antenna 840.

The base station apparatus 850 includes a controller 851, a memory 852, a network interface 853, a wireless communication interface 855, and a connection interface 857. The controller 851, the memory 852, and the network interface 853 are similar respectively to the controller 821, the memory 822, and the network interface 823 that have been described with reference to FIG. 40.

The wireless communication interface 855 supports any cellular communication system such as LTE or LTE-Advanced, and provides wireless connection to a terminal located in a sector corresponding to the RRH 860 via the RRH 860 and the antenna 840. The wireless communication interface 855 may typically include a BB processor 856, and the like. The BB processor 856 is similar to the BB processor 826 that has been described with reference to FIG. 40 except that the BB processor 856 is coupled to an RF circuit 864 of the RRH 860 via the connection interface 857. The wireless communication interface 855 includes a plurality of BB processors 856 as illustrated in FIG. 41, and for example, each of the plurality of BB processors 856 may correspond to one of a plurality of frequency bands used by the eNB 830. It is to be noted that FIG. 41 illustrates an example of the wireless communication interface 855 including the plurality of BB processors 856, but the wireless communication interface 855 may include a single BB processor 856.

The connection interface 857 is an interface through which to couple the base station apparatus 850 (wireless communication interface 855) with the RRH 860. The connection interface 857 may be a communication module for communication on the above-described high-speed line that couples the base station apparatus 850 (wireless communication interface 855) and the RRH 860.

In addition, the RRH 860 includes a connection interface 861 and a wireless communication interface 863.

The connection interface 861 is an interface through which to couple the RRH 860 (wireless communication interface 863) with the base station apparatus 850. The connection interface 861 may be a communication module for communication on the above-described high-speed line.

The wireless communication interface 863 receives and transmits a wireless signal via the antenna 840. The wireless communication interface 863 may typically include the RF circuit 864, and the like. The RF circuit 864 may include a mixer, a filter, an amplifier, and the like, and receives and transmits a wireless signal via the antenna 840. The wireless communication interface 863 includes a plurality of RF circuits 864 as illustrated in FIG. 41, and for example, each of the plurality of RF circuits 864 may correspond to one of a plurality of antenna elements. It is to be noted that FIG. 41 illustrates an example of the wireless communication interface 863 including the plurality of RF circuits 864, but the wireless communication interface 863 may include a single RF circuit 864.

In the eNB 830 illustrated in FIG. 41, one or more components included in the eNB 14a that has been described with reference to FIG. 5 (for example, the processing section 140) may be implemented in the wireless communication interface 855 and/or the wireless communication interface 863. Alternatively, at least a portion of these components may be implemented in the controller 851. As an example, the eNB 830 may be mounted with a module that includes a portion (for example, the BB processor 856) or all of the wireless communication interface 855, and/or the controller 851, and the above-described one or more components may be implemented in the module. In this case, the above-described module may hold a program for causing a processor to function as the above-described one or more components (in other words, a program for causing a processor to execute an operation of the above-described one or more components), and execute the program. As another example, a program for causing a processor to function as the above-described one or more components may be installed on the eNB 830, and the wireless communication interface 855 (for example, the BB processor 856) and/or the controller 851 may execute the program. As described above, the eNB 830, the base station apparatus 850, or the above-described module may be provided as an apparatus including the above-described one or more components, or a program for causing a processor to function as the above-described one or more components may be provided. In addition, a readable recording medium on which the above-described program is recorded may be provided.

In addition, in the eNB 830 illustrated in FIG. 41, for example, the wireless communication section 120 that has been described with reference to FIG. 5 may be implemented in the wireless communication interface 863 (for example, the RF circuit 864). In addition, the antenna section 310 may be implemented in the antenna 840. In addition, the network communication section 330 may be implemented in the controller 851 and/or the network interface 853. In addition, the storage section 340 may be implemented in the memory 852.

[2.3. Application Example Regarding Terminal Apparatus]
(First Application Example)

FIG. 42 is a block diagram that illustrates an example of a schematic configuration of a smartphone 900 to which a technique according to the present disclosure is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

For example, the processor 901 may be a CPU or an SoC (System on Chip), and controls a function of an application layer and another layer of the smartphone 900. The memory 902 includes a RAM and a ROM, and holds a program to be executed by the processor 901 and data. The storage 903 may include a storage medium such as a semiconductor memory or a hard disk. The external connection interface 904 is an interface through which to couple an external device such as a memory card or a USB (Universal Serial Bus) device to the smartphone 900.

For example, the camera 906 includes an imaging element such as a CCD (Charge Coupled Device) or a CMOS (Complementary Metal Oxide Semiconductor), and generates a captured image. For example, the sensor 907 may include a sensor group such as a positioning sensor, a gyro sensor, a geomagnetic sensor, and an acceleration sensor. The microphone 908 converts, into a voice signal, a voice inputted into the smartphone 900. For example, the input device 909 includes a touch sensor that detects a touch on a screen of the display device 910, a keypad, a keyboard, a button, a switch, or the like, and accepts an operation or an information input from a user. The display device 910 includes a screen such as a liquid crystal display (LCD) or an organic light-emitting diode (OLED) display, and displays an image outputted from the smartphone 900. The speaker 911 converts into a voice, a voice signal outputted from the smartphone 900.

The wireless communication interface 912 supports any cellular communication system such as LTE or LTE-Advanced, and executes wireless communication. The wireless communication interface 912 may typically include a BB processor 913, an RF circuit 914, and the like. For example, the BB processor 913 may perform coding/decoding, modulation/demodulation, multiplexing/demultiplexing, and the like, and executes various signal processing for wireless communication. Meanwhile, the RF circuit 914 may include a mixer, a filter, an amplifier, and the like, and receives and transmits a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 42. It is to be noted that FIG. 42 illustrates an example of the wireless communication interface 912 including a plurality of BB processors 913 and a plurality of RF circuits 914, but the wireless communication interface 912 may include a single BB processor 913 or a single RF circuit 914.

Furthermore, the wireless communication interface 912 may support, in addition to the cellular communication system, another type of wireless communication system such as a Near Field Communication system, a proximity wireless communication system, or a wireless LAN (Local Area Network) system, and in that case, may include the BB processor 913 and the RF circuit 914 for each wireless communication system.

Each antenna switch 915 switches a connection destination of the antenna 916 between a plurality of circuits (for example, circuits for different wireless communication systems) included in the wireless communication interface 912.

Each antenna 916 has a single or a plurality of antenna elements (for example, a plurality of antenna elements included in a MIMO antenna), and is used for reception and transmission of a wireless signal by the wireless communication interface 912. The smartphone 900 may have a plurality of antennas 916 as illustrated in FIG. 42. It is to be noted that FIG. 42 illustrates an example of the smartphone 900 having the plurality of antennas 916, but the smartphone 900 may have a single antenna 916.

Furthermore, the smartphone 900 may include the antenna 916 for each wireless communication system. In that case, the antenna switch 915 may be omitted from a configuration of the smartphone 900.

The bus 917 couples, to each other, the processor 901, the memory 902, the storage 903, the external connection interface 904, the camera 906, the sensor 907, the microphone 908, the input device 909, the display device 910, the speaker 911, the wireless communication interface 912, and the auxiliary controller 919. The battery 918 supplies power to each block in the smartphone 900 illustrated in FIG. 42, via a feeding line partially illustrated by a dashed line in the figure. For example, in a sleep mode, the auxiliary controller 919 operates a minimum necessary function of the smartphone 900.

In the smartphone 900 illustrated in FIG. 42, one or more components included in the UE 15*a* that has been described with reference to FIG. 6 (for example, the communication control section 243) may be implemented in the wireless communication interface 912. Alternatively, at least a portion of these components may be implemented in the processor 901 or the auxiliary controller 919. As an example, the smartphone 900 may be mounted with a module that includes a portion (for example, the BB processor 913) or all of the wireless communication interface 912, the processor 901, and/or the auxiliary controller 919, and the above-described one or more components may be implemented in the module. In this case, the above-described module may hold a program for causing a processor to function as the above-described one or more components (in other words, a program for causing a processor to execute an operation of the above-described one or more components), and execute the program. As another example, a program for causing a processor to function as the above-described one or more components may be installed on the smartphone 900, and the wireless communication interface 912 (for example, the BB processor 913), the processor 901, and/or the auxiliary controller 919 may execute the program. As described above, the smartphone 900 or the above-described module may be provided as an apparatus including the above-described one or more components, or a program for causing a processor to function as the above-described one or more components may be provided. In addition, a readable recording medium on which the above-described program is recorded may be provided.

In addition, in the smartphone 900 illustrated in FIG. 42, for example, the wireless communication section 220 that has been described with reference to FIG. 6 may be implemented in the wireless communication interface 912 (for example, the RF circuit 914). In addition, the antenna section 210 may be implemented in the antenna 916. In addition, the storage section 230 may be implemented in the memory 902.

(Second Application Example)

FIG. 43 is a block diagram that illustrates an example of a schematic configuration of a car navigation apparatus 920 to which a technique according to the present disclosure is applicable. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

For example, the processor 921 may be a CPU or an SoC, and controls a navigation function and another function of the car navigation apparatus 920. The memory 922 includes a RAM and a ROM, and holds a program to be executed by the processor 921 and data.

A GPS module 924 measures a position (for example, a latitude, a longitude, and an altitude) of the car navigation apparatus 920, using a GPS signal received from a GPS satellite. For example, the sensor 925 may include a sensor group such as a gyro sensor, a geomagnetic sensor, and an air pressure sensor. For example, the data interface 926 is coupled to an in-vehicle network 941 via a terminal that is not illustrated, and obtains data generated on a vehicle side, such as vehicle speed data.

The content player 927 reproduces a content held on a storage medium (for example, a CD or a DVD) that is inserted into the storage medium interface 928. For example, the input device 929 includes a touch sensor that detects a touch on a screen of the display device 930, a button, a switch, or the like, and accepts an operation or an information input from a user. The display device 930 includes a screen such as an LCD or an OLED display, and displays a navigation function or an image of the content that is reproduced. The speaker 931 outputs a voice of the navigation function or of the content that is reproduced.

The wireless communication interface 933 supports any cellular communication system such as LTE or LTE-Advanced, and executes wireless communication. The wireless communication interface 933 may typically include a BB processor 934, an RF circuit 935, and the like. For example, the BB processor 934 may perform coding/decoding, modulation/demodulation, multiplexing/demultiplexing, and the like, and executes various signal processing for wireless communication. Meanwhile, the RF circuit 935 may include a mixer, a filter, an amplifier, and the like, and receives and transmits a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 43. It is to be noted that FIG. 43 illustrates an example of the wireless communication interface 933 including the plurality of BB processors 934 and the plurality of RF circuits 935, but the wireless communication interface 933 may include a single BB processor 934 or a single RF circuit 935.

Furthermore, the wireless communication interface 933 may support, in addition to the cellular communication system, another type of wireless communication system such as a Near Field Communication system, a proximity wireless communication system, or a wireless LAN system, and in that case, may include the BB processor 934 and the RF circuit 935 for each wireless communication system.

Each antenna switch 936 switches a connection destination of the antenna 937 between a plurality of circuits (for example, circuits for different wireless communication systems) included in the wireless communication interface 933.

Each antenna 937 has a single or a plurality of antenna elements (for example, a plurality of antenna elements included in a MIMO antenna), and is used for reception and transmission of a wireless signal by the wireless communication interface 933. The car navigation apparatus 920 may have a plurality of antennas 937 as illustrated in FIG. 43. It is to be noted that FIG. 43 illustrates an example of the car navigation apparatus 920 having the plurality of antennas 937, but the car navigation apparatus 920 may have a single antenna 937.

Furthermore, the car navigation apparatus 920 may include the antenna 937 for each wireless communication system. In that case, the antenna switch 936 may be omitted from a configuration of the car navigation apparatus 920.

The battery 938 supplies power to each block in the car navigation apparatus 920 illustrated in FIG. 43, via a feeding line partially illustrated by a dashed line in the figure. In addition, the battery 938 accumulates power fed from a vehicle side.

In the car navigation apparatus 920 illustrated in FIG. 43, one or more components included in the UE 15a that has been described with reference to FIG. 6 (for example, the communication control section 243) may be implemented in the wireless communication interface 933. Alternatively, at least a portion of these components may be implemented in the processor 921. As an example, the car navigation apparatus 920 may be mounted with a module that includes a portion (for example, the BB processor 934) or all of the wireless communication interface 933, and/or the processor 921, and the above-described one or more components may be implemented in the module. In this case, the above-described module may hold a program for causing a processor to function as the above-described one or more components (in other words, a program for causing a processor to execute an operation of the above-described one or more components), and execute the program. As another example, a program for causing a processor to function as the above-described one or more components may be installed on the car navigation apparatus 920, and the wireless communication interface 933 (for example, the BB processor 934) and/or the processor 921 may execute the program. As described above, the car navigation apparatus 920 or the above-described module may be provided as an apparatus including the above-described one or more components, or a program for causing a processor to function as the above-described one or more components may be provided. In addition, a readable recording medium on which the above-described program is recorded may be provided.

In addition, in the car navigation apparatus 920 illustrated in FIG. 43, for example, the wireless communication section 220 that has been described with reference to FIG. 6 may be implemented in the wireless communication interface 933 (for example, the RF circuit 935). In addition, the antenna section 210 may be implemented in the antenna 937. In addition, the storage section 230 may be implemented in the memory 922.

In addition, a technique according to the present disclosure may be achieved as an in-vehicle system (or a vehicle) 940 that includes one or more blocks in the car navigation apparatus 920, the in-vehicle network 941, and a vehicle-side module 942. In other words, the in-vehicle system (or the vehicle) 940 may be provided as an apparatus that includes a relay section 241 and the communication control section 243. The vehicle-side module 942 generates vehicle-side data such as vehicle speed, engine rotation speed, or failure information, and outputs the generated data to the in-vehicle network 941.

3. Conclusion

As described above, according to an embodiment of the present disclosure, it is possible to provide, by specifying an IPv6 address format based on Locator/ID separation, a network system 1 that enables efficient slice construction as compared to an existing slice construction method. The network system 1 according to an embodiment of the present disclosure does not generate a header overhead for slice construction. Thus, the network system 1 according to an embodiment of the present disclosure avoids a decrease in throughput at the time of slice construction. In addition, if the operating system allows a use of MPLS, it is not necessary for the network system 1 according to an embodiment of the present disclosure to have a kernel of the operating system changed.

Each step in processing executed by each apparatus in the present specification does not necessarily have be processed in time series in an order described as a sequence diagram or a flowchart. For example, even if processed in an order different from the order described as the flowchart, each step in the processing executed by each apparatus may be processed in parallel.

In addition, it is also possible to create a computer program for causing hardware included in each apparatus, such as a CPU, a ROM, and a RAM to perform a function equivalent to a function of the configuration of each of the foregoing apparatuses. In addition, it is also possible to provide a storage medium that holds the computer program. In addition, it is also possible to achieve a series of processing using hardware by configuring, with hardware, each function block illustrated in a functional block diagram.

Although the description has been given in detail hereinabove of the preferred embodiments of the present disclosure with reference to the accompanying drawings, the technical scope of the present disclosure is not limited to such examples. It is apparent that a person having ordinary skill in the art of the present disclosure may arrive at various alterations or modifications within the scope of the technical idea described in the claims, and it should be understood that these alterations and modifications naturally fall under the technical scope of the present disclosure.

In addition, the effects described herein are merely illustrative or exemplary, and are not limitative. That is, the technique according to the present disclosure may achieve, in addition to or in place of the above effects, other effects that are apparent to those skilled in the art from the description of the present specification.

It is to be noted that the following configurations also fall under the technical scope of the present disclosure.

(1)

A communication apparatus including a communication control section that performs communication control on one or more network slices, the communication control being performed using a network address configured by m bytes, the network address having a prefix section that includes, in a portion of high-order n bytes, a slice number and a subnet number, the slice number identifying the one or more network slices, and the subnet number being in the one or more network slices.

(2)

The communication apparatus according to (1), in which the network address has an Interface ID section that includes the slice number in a portion of a low-order (m−n) bytes.

(3)

The communication apparatus according to (1) or (2), further including a storage section that holds a routing table, the routing table indicating the prefix section and network address information, the prefix section being in a destination address of data, and the network address information regarding a node to which the data is to be transmitted next.

(4)

The communication apparatus according to (3), in which the communication control section determines, with reference to the routing table, a transmission destination of the data that has been received.

(5)

The communication apparatus according to (3) or (4), in which the routing table is set for each of the one or more network slices.

(6)

The communication apparatus according to any one of (1) to (5), in which the communication control section obtains the slice number and embeds, at a predetermined position in the network address, the slice number that has been received.

(7)

The communication apparatus according to (6), in which the slice number is determined in accordance with a type of application to be executed.

(8)

The communication apparatus according to any one of (1) to (7), in which the one or more network slices includes a plurality of network slices, and information for isolating a network resource between the network slices is added to a former part of the network address.

(9)

The communication apparatus according to any one of (1) to (8), in which, when a connection destination with which to perform wireless communication changes, the communication control section rewrites the subnet number in the prefix section to a subnet number corresponding to the connection destination that is renewed.

(10)

The communication apparatus according to any one of (1) to (9), in which the network address conforms to a format of an IP (Internet Protocol) v6 address.

(11)

A communication method including causing a processor to perform communication control on one or more network slices, the communication control being performed using a network address configured by m bytes, the network address having a prefix section that includes, in a portion of high-order n bytes, a slice number and a subnet number, the slice number identifying the one or more network slices, and the subnet number being in the one or more network slices.

(12)

A computer program that causes a computer to execute communication control on one or more network slices, the communication control being performed using a network address configured by m bytes, the network address having a prefix section that includes, in a portion of high-order n bytes, a slice number and a subnet number, the slice number identifying the one or more network slices, and the subnet number being in the one or more network slices.

REFERENCE NUMERALS LIST

3 CN
10 physical network
11 PGW
12*a*, 12*b*, 12*c* RT
14*a*, 14*b* eNB
15*a*, 15*b* UE

The invention claimed is:

1. A communication apparatus, comprising:
   a processor configured to:
   receive data for transmission;
   execute communication control on at least one network slice, wherein the communication control is executed based on a
network address,
the network address includes:
m bytes that includes a plurality of bytes;
high-order n bytes of the plurality of bytes as a
locator section; and
low-order m-n bytes of the plurality of bytes as an
interface ID section,
the locator section includes a slice number and a
subnet number,
the interface ID section includes the slice number,
the slice number is for identification of the at least
one network slice, and
the subnet number represents a subnet in the at least
one network slice, and
transmit the data based on a routing table set for each
network slice of the at least one network slice,
wherein
the routing table indicates the locator section and
network address information,
the locator section indicates a destination address of
the data,
the network address information includes information of a node, and
the node is a transmission destination of the data.

2. The communication apparatus according to claim 1, further comprising a storage device configured to hold the routing table.

3. The communication apparatus according to claim 1, wherein the processor is further configured to determine, based on the routing table, the transmission destination of the data.

4. The communication apparatus according to claim 1, wherein the processor is further configured to:
determine the slice number of the at least one network slice; and
embed, at a specific position in the network address, the determined slice number.

5. The communication apparatus according to claim 4, wherein the processor is further configured to determine the slice number based on a type of an application to be executed.

6. The communication apparatus according to claim 1, wherein
the at least one network slice comprises a plurality of network slices, and
information for isolation of a network resource of each network slice of the plurality of network slices is in a former part of the network address.

7. The communication apparatus according to claim 1, wherein
based on a change in a connection destination of wireless communication, the processor is further configured to rewrite the subnet number in the locator section, and
the rewritten subnet number corresponds to the changed connection destination.

8. The communication apparatus according to claim 1, wherein the network address conforms to a format of an IP (Internet Protocol) v6 address.

9. A communication method, comprising:
receiving, by a processor, data for transmission;
executing, by the processor, communication control on at least one network slice, wherein
the communication control is executed based on a network address,
the network address includes:
m bytes that includes a plurality of bytes;
high-order n bytes of the plurality of bytes as a
locator section; and
low-order m-n bytes of the plurality of bytes as an
interface ID section,
the locator section includes a slice number and a subnet number,
the interface ID section includes the slice number,
the slice number is for identification of the at least one network slice, and
the subnet number represents a subnet in the at least one network slice; and
transmitting the data, by the processor, based on a routing table set for each network slice of the at least one network slice, wherein
the routing table indicates the locator section and network address information,
the locator section indicates a destination address of the data,
the network address information includes information of a node, and
the node is a transmission destination of the data.

10. A non-transitory computer-readable medium having stored thereon, computer-executable instructions, which when executed by a computer, cause the computer to execute operations, the operations comprising:
receiving data for transmission;
executing communication control on at least one network slice, wherein
the communication control is executed based on a network address,
the network address includes:
m bytes that includes a plurality of bytes;
high-order n bytes of the plurality of bytes as a
locator section; and
low-order m-n bytes of the plurality of bytes as an
interface ID section,
the locator section includes a slice number and a subnet number,
the interface ID section includes the slice number,
the slice number is for identification of the at least one network slice, and
the subnet number represents a subnet in the at least one network slice; and
transmitting the data based on a routing table set for each network slice of the at least one network slice, wherein
the routing table indicates the locator section and network address information,
the locator section indicates a destination address of the data,
the network address information includes information of a node, and
the node is a transmission destination of the data.

11. A communication apparatus, comprising:
a processor configured to:
determine, based on a type of an application to be executed, a slice number of at least one network slice;
embed, at a specific position in a network address, the determined slice number; and
execute communication control on the at least one network slice, wherein
the communication control is executed based on the network address,
the network address includes:
m bytes that includes a plurality of bytes;
high-order n bytes of the plurality of bytes as a
locator section; and low-order m-n bytes of the plurality of bytes as an interface ID section,
the locator section includes the slice number and a subnet number,
the interface ID section includes the slice number,
the slice number is for identification of the at least one network slice, and
the subnet number represents a subnet in the at least one network slice.

* * * * *